United States Patent [19]

Games et al.

[11] 4,215,408
[45] Jul. 29, 1980

[54] TEMPERATURE CONTROL OF UNOCCUPIED LIVING SPACES

[75] Inventors: John E. Games, Granby; William W. Bitterli, Simsbury, both of Conn.

[73] Assignee: United Technologies Corporation, Hartford, Conn.

[21] Appl. No.: 860,026

[22] Filed: Dec. 12, 1977

[51] Int. Cl.² .................... G06F 15/20; F24F 3/00
[52] U.S. Cl. ..................... 364/505; 165/22; 165/26; 236/46 R
[58] Field of Search ............. 364/505; 236/46 R; 165/12–14, 16, 22, 26

[56] References Cited

U.S. PATENT DOCUMENTS

| | | | |
|---|---|---|---|
| 3,834,617 | 9/1974 | Dyntar | 165/26 X |
| 3,933,197 | 1/1976 | Zimmer et al. | 236/46 R X |
| 3,964,676 | 6/1976 | Rooks et al. | 236/46 R |
| 3,979,059 | 9/1976 | Davis et al. | 236/46 R |
| 4,071,745 | 1/1978 | Hall | 165/22 X |
| 4,106,690 | 8/1978 | Thomlinson | 236/46 R |

*Primary Examiner*—Jerry Smith
*Attorney, Agent, or Firm*—Dominic J. Chiantera

[57] ABSTRACT

Apparatus is provided for controlling, during unoccupied periods, the operation of an HVAC system and perimeter heating system providing hot air and hot fluid, respectively, to a temperature controlled living space having occupied and unoccupied periods, the apparatus including an electronic processing means in combination with dedicated sensing apparatus, the apparatus providing controlled actuation of the HVAC and perimeter heating system in dependence on the temperature difference between an actual space temperature signal and unoccupied space heat and cool reference temperature signals, the apparatus further providing an optimum start-up procedure including simultaneous actuation of the HVAC and perimeter heating system to accelerate the heating of the space, the HVAC discharge temperature being modulated during the start-up procedure in dependence on the temperature difference between the actual space temperature and an occupied space heat reference temperature signal, the perimeter heating system discharge temperature being preset to a start-up reference discharge temperature having a value greater than that maximum perimeter heating system discharge temperature permitted in normal operation.

16 Claims, 13 Drawing Figures

TEMPERATURE CONTROL OF UNOCCUPIED LIVING SPACES

CROSS REFERENCE TO RELATED APPLICATIONS

Portions of the subject matter hereof are also disclosed in one or more of the following, commonly owned, copending applications entitled ENERGY CONSERVATIVE CONTROL OF HEATING, VENTILATING, AND AIR CONDITIONING (HVAC) SYSTEMS, Ser. No. 829,379, filed on Aug. 31, 1977 by John E. Games et al, ENERGY CONSERVATIVE CONTROL OF TERMINAL REHEAT HEATING, VENTILATING, AND AIR CONDITIONING (HVAC) SYSTEMS, Ser. No. 836,118, filed on Sept. 23, 1977 by William W. Bitterli et al and now abandoned, and TEMPERATURE CONTROL OF CHILL WATER AND STEAM IN HEATING, VENTILATION, AIR CONDITIONING (HVAC) SYSTEMS, Ser. No. 845,110, filed on Oct. 25, 1977 by David M. Healey et al.

BACKGROUND OF THE INVENTION

1. Field of Invention

This invention relates to automatic control of heating, ventilating, and air conditioning (HVAC) systems and perimeter heating systems providing heat to a temperature regulated space having occupied and unoccupied periods, and more particularly to automatic control of HVAC and perimeter heating systems during unoccupied periods of the space.

2. Description of the Prior Art

As may be known, HVAC systems are used for regulating the temperature in one or more living spaces within a building enclosure. Similarly, as may be known, perimeter heating systems are used to provide supplemental heating to that provided by the HVAC system in those living spaces located along the perimeter of the building, which are subject to more severe ambient temperature changes due to the "cold wall effect" produced by outside temperature and wind conditions. The HVAC systems may be of a variety of well-known types, such as the multi-zone, dual duct, or terminal reheat type systems, each having an air handler source which includes individually controlled heating and cooling apparatus for conditioning mixed air presented to the air handler from a mixed air chamber. The mixed air chamber provides the mixed air as a combination of outside air and return conditioned air from the space, the ratio of each being determined by position modulation of mixed air dampers within the chamber. Each type of HVAC includes at least one system fan, having a high horse power rating as required for forcing a large volume of mixed air through the air handler and associated hot and cold decks into the space. Although the heating and cooling apparatus account for a major portion of the energy consumed by the HVAC during operation, the fans account for a substantial portion of the total HVAC energy consumption, and provide the highest electrical energy consumption device in the system.

The perimeter heating system includes a hot source for providing a hot fluid, such as hot water, to heaters installed in the perimeter living spaces. A pump provides circulation of the hot water through the spaces serviced by the system, back to the hot source. As with the HVAC fan, the perimeter heating system pump is a high horsepower device as required to provide a sufficient hot water flow rate through the system, and as such accounts for a substantial portion of the total energy consumption of the perimeter heating system.

In general, the living spaces serviced by the HVAC and perimeter heating systems have scheduled human occupancy periods, resulting in unoccupied periods extending over hours or days. During the unoccupied periods it is desirable to relax the space ambient temperature requirements to heating and cooling reference temperature values which are lower and higher, respectively, than those temperatures required for human comfort, in order to conserve energy. The space ambient temperature during the unoccupied periods must be high enough to protect against freezing of the space in the event of sudden drops in the outside ambient temperature, and low enough to protect against overheat due to either self-heating, or an increase in outside temperature. At present, a number of systems are known in the art for providing "set-back", or unoccupied, reference temperatures for controlling the HVAC operation during the unoccupied period of the space. These prior art systems provide the set-back references at a lower heating reference temperature and a higher cooling temperature than that provided during occupied periods, however, due to system limitations the set-back temperature references are selected at conservative values above and below the freezing point and overheat temperatures to ensure the protection of the space. As a result the temperature differential between the set-back heat and cool reference temperature does not differ substantially from the temperature differential between the corresponding occupied reference values, such that although energy conservation is realized, the fully realizeable energy savings is not achieved. The prior art systems make no provision for controlling the operation of the HVAC fan, i.e. turning on the fan only as required to provide air circulation through the air handler and living space when either the HVAC heating or cooling apparatus is on during the unoccupied period. The fan is generally left on throughout the unoccupied period in anticipation of required mechanical heating or cooling to the set-back reference temperatures, and is shut down only in the event of a complete system shutdown. Similarly, the prior art systems do not provide selective turn on of the perimeter heating system hot source or actuation of the pump, each remaining on or fully shut down, depending upon the anticipated outside ambient conditions during the unoccupied period.

As a consequence of the set-back temperature regulation of the space during the unoccupied periods, there is a requirement that the space ambient temperature be within the occupied temperature reference limits prior to human occupancy in the space. Generally, the prior art systems ensure that the ambient temperature is at the occupied reference limits by providing an extended start-up, or pre-heat period within the latter portion of the unoccupied period during which the HVAC is turned on, and controlled to the occupied temperature reference values to provide the required occupied ambient temperature conditions. As may be appreciated, the longer the start-up period, the shorter the total time interval for the set-back period, and consequently the less effective the energy conservation. A typical prior art system for controlling the unoccupied space temperature to conserve energy and to provide a desired occupied temperature at a predetermined occupied time, is disclosed in a patent to Davis et al, U.S. Pat. No. 3,979,059, wherein the space temperature is increased in a "pre-heat period" from a set-back temperature reference to an occupied temperature reference in dependence on the temperature conditions within the space and outside the building. The heating apparatus is controlled to the differential temperature between the occupied and unoccupied set point references and is modified in dependence on the outside air temperature. A provision is also made for an extended pre-heat period following a longer than usual off period, i.e. a weekend. Through the use of both inside and outside air temperatures the Davis system provides the required occupied ambient conditions prior to the end of the unoccupied period, however, the pre-heat required is shown to be a substantial portion of the unoccupied period. In the case of a normal unoccupied period, i.e. overnight during the week, the required pre-heat period is typically fifty percent of the total unoccupied period, which limits substantially the amount of energy saving provided by the set-back control procedure.

In addition, the prior art systems, including that of Davis, do not consider outside wind conditions in establishing the time duration of the pre-heat period. As may be known, the effect of wind on the ambient temperature conditions within the perimeter living spaces is substantial, the wind contributing to the cold wall effect, and the ambient temperature of the perimeter spaces being directly proportional to the average wind speed. As a result the interior living spaces may be provided with suitable ambient temperature conditions prior to occupancy, while the perimeter spaces may be at a significantly lower ambient temperature value.

SUMMARY OF THE INVENTION

An object of the present invention is to provide a system for automatically controlling the actuation of an HVAC heating and cooling apparatus, and fan, selectively, as required to provide freeze-up and overheat protection of an unoccupied living space. Another object of the present invention is to provide a system for controlling, simultaneously, the operation of an HVAC system and a perimeter heating system, in combination, to maintain temperature regulation within an unoccupied living space. A still further object of the present invention is to provide a system for controlling the HVAC and perimeter heating system in combination to accelerate the rate of change in space ambient temperature conditions from unoccupied reference temperature conditions to occupied reference temperature conditions, to provide a shortened start-up period time interval. A still further object of the present invention is to provide a system for determining an actual optimum start-up time in each of the space unoccupied periods in dependence on a sensed outside air average wind speed.

In accordance with the present invention, an electronic processing means is connected to the heating and cooling apparatus, fan, and mixed air dampers of the HVAC system, through known interface apparatus, and sensing apparatus is disposed within the HVAC system, the living space, and the outside area adjacent to the building, to provide sensed signal parameters representative of an actual space temperature, an actual outside air temperarture, an actual outside average wind, speed, and actual HVAC conditioned air discharge temperatures, the electronic processing means providing an actual time of day signal, and including a memory for storing signals including real time signals defining real time intervals each representative of an associated occupied, and unoccupied period of the space, the memory further including signals representative of the unoccupied space heat and cool reference temperatures, the processing means providing an unoccupied signal manifestation in response to the presence of an actual time of day signal indicative of a present unoccupied period, the processing means further providing, in response to the unoccupied signal manifestation, a shutdown of the HVAC heating and cooling apparatus, and HVAC fan in the presence of an actual space temperature signal indicative of a temperature within the range of temperature between the unoccupied space heat and cool reference temperature signals, the processing means providing a turn on of the fan and the associated heating and cooling apparatus in response to an actual space temperature signal below or above the related unoccupied space heat and cool reference temperature signal, the processing means providing, in response to a turn on of the heating or cooling apparatus, modulation of the HVAC conditioned air discharge temperature in dependence on the unoccupied space reference temperature signals. In further accord with the present invention, the memory further includes real time signals defining a pre-cool time period within each unoccupied period, the processing means providing, in response to the presence of an unoccupied signal manifestation concurrent with an actual time of day signal indicative of a present pre-cool time period, position modulation of the mixed air dampers to provide temperature regulation of the space to a mixed air temperature reference signal having a temperature value selected from the range of temperatures between the unoccupied space heat and cool temperature reference signals. In still further accord with the present invention, the processing means is further connected to the perimeter heating system pump and hot source, through known interface apparatus, and the sensing apparatus further includes temperature sensing means disposed within the hot source for providing an actual hot fluid discharge temperature signal, the memory further including a perimeter heat actuating reference temperature signal representative of a temperature value higher than that of the unoccupied space heat reference temperature signal, the processing means providing, in response to the unoccupied signal manifestation in the presence of an actual space temperature signal indicative of a temperature higher than that of the perimeter heat actuating temperature reference signal, a shutdown of the perimeter heating system pump and hot source simultaneous with the shutdown of the HVAC heating and cooling apparatus and fan, the processing means providing a turn on of the perimeter heating system pump and hot source in response to an actual space temperature indicative of a temperature value less than the perimeter heat actuating reference temperature signal value, the processing means further providing a turn on of the HVAC fan and heating apparatus in response to an actual space temperature signal magnitude less than that of the unoccupied space heat reference temperature signal in the presence of a turn on of the perimeter heating system. In still further accord with the present invention, the memory includes occupied space heat and cool reference temperature signals, and further includes real time signals representative of a real time interval start-up period within each unoccupied period, the processing means providing in response to an actual time of day signal indicative of a resent start-up period in the presence of the unoccupied signal manifestation, a start signal manifestation, the processing means providing in response to the start signal manifestation, in the presence or absence of an unoccupied space temperature error signal, simultaneous turn on of the HVAC fan and heating apparatus together with the perimeter heating system pump and hot source, the processing means providing control of the HVAC conditioned air discharge temperature in dependence on an occupied space temperature error signal having a magnitude equal to the temperature difference between the actual space temperature signal and the occupied space heat reference temperature signal, the processing means further providing control of the hot source discharge temperature to a start-up discharge temperature value greater than the maximum discharge temperature provided in normal operation of the hot source. In still further accord with the present invention, the processing means provides, in each start-up period, an optimum start-up time signal, the processing means providing the start signal manifestation in response to an actual time of day signal indicative of a present time equal to that of the optimum start-up time signal, the processing means providing the optimum start-up time signal value for each unoccupied period in dependence on the thermal response characteristics of the space in response to the sensed signal parameters of actual space temperature, actual outside air temperature and actual outside wind speed, the optimum start-up time signal value being directly proportional to the magnitude of the average wind speed signal magnitude.

The unoccupied control of the HVAC, and of the HVAC and perimeter heating system in combination, according to the present invention, provides for maximum energy conservation during the unoccupied periods of the space. The sensed ambient conditions within the space, and outside the building are constantly monitored by the processing means which then actuates the systems only in response to actual space temperatures which deviate from the unoccupied values. The efficiency of the present control system allows for a shutdown of both systems when not required to maintain the unoccupied ambient conditions, in addition to permitting lower heating references and higher cooling references, thereby increasing the energy savings during the unoccupied periods. In addition, the simultaneous actuation of both the HVAC and perimeter heating systems prior to occupancy permits the rapid acceleration of the space ambient temperature to the occupied reference limits, significantly shortening the start-up interval and allowing for an extended unoccupied period control which further increases the energy savings during the unoccupied period, the typical start-up period provided by the present invention being one-half that of the prior art systems.

These and other objects, features and advantages of the present invention will become more apparent in the light of the following description of a detailed embodiment thereof, as illustrated in the accompanying drawing.

DETAILED DESCRIPTION

Figure 4:
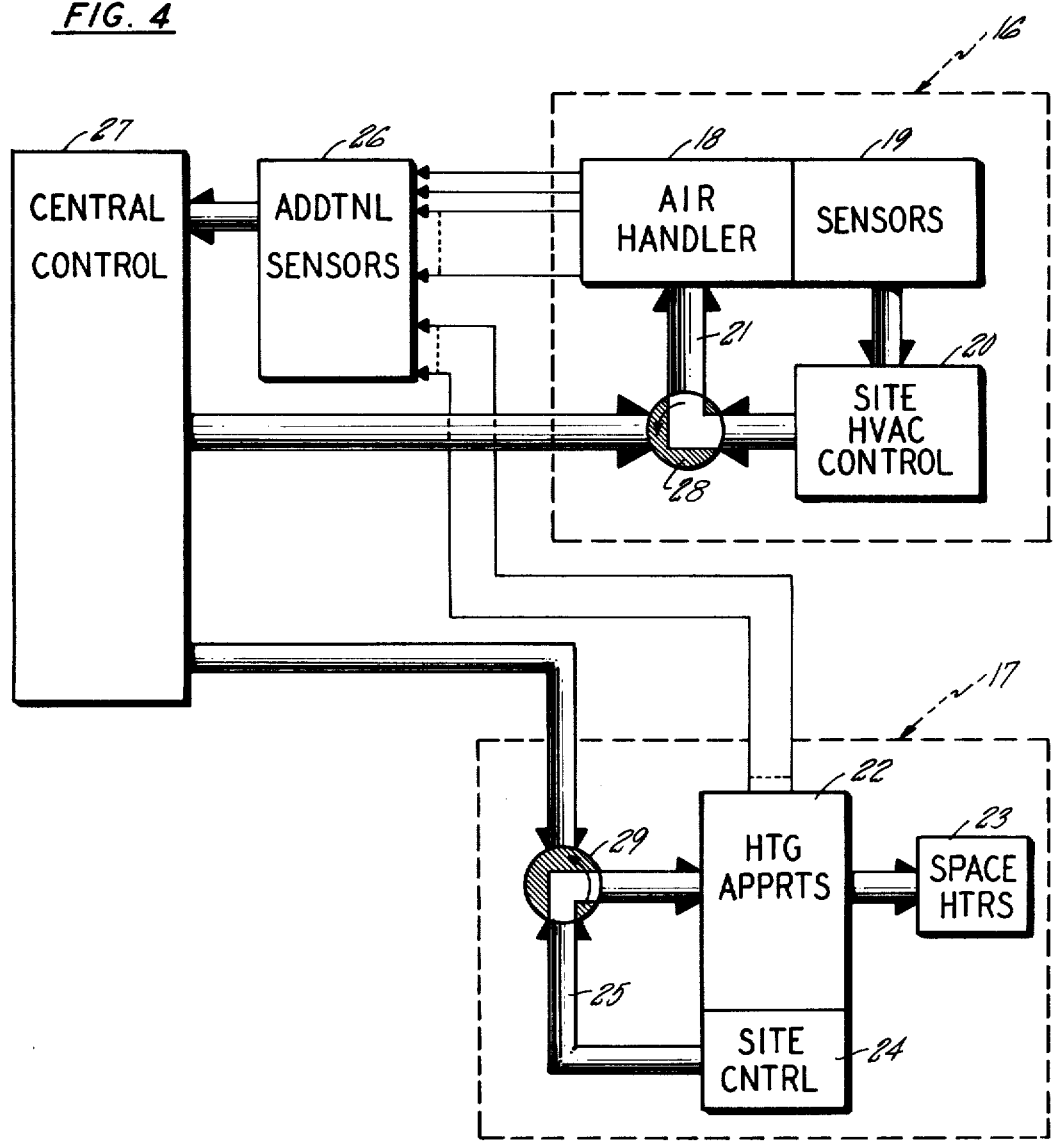
FIG. 4 is a simplified block diagram of the interconnection of the control system of the present invention with a HVAC and a perimeter heating system.

The temperature regulation of the unoccupied living spaces within a building, according to the present invention, is provided through the same sensing and control interface apparatus provided in the central control of a heating, ventilating and air conditioning (HVAC) system disclosed by Games et al, and the control of a common thermal source disclosed by Healey et al, in the hereinbefore referenced, copending applications. The interface apparatus may be added directly to installed HVAC and perimeter heating (PH) systems, or as an addition to new system installations. In a preferred embodiment, the present control is used in combination with the central control functions of Games and Healey to provide total energy conservation temperature control within the building living spaces. Referring first to FIG. 4, in a simplified block diagram illustration of the interconnection between the present control and apparatus for providing temperature regulation in one or more living spaces within a building enclosure, the apparatus may include a heating, ventilating and air conditioning (HVAC) system 16, and a perimeter heating (PH) system 17. The HVAC system includes an air handler 18 for providing conditioned discharge air to the living spaces. The discharge air is monitored by temperature sensors 19 which provide the sensed temperature signals to a site HVAC control 20. The site control is mounted in close proximity to the air handler source and provides control signals to the air handler through lines 21 to regulate the discharge temperatures of the heating and cooling apparatus included therein. The perimeter heating (PH) system 17 includes heating apparatus 22 which provides supplemental heating in selected living spaces along the perimeter of the building through space heaters 23 installed in the spaces, as described in detail hereinafter. Typically the PH system is controlled with a similar site control 24, disposed on or near the heating source, and which provides the source with control signals through lines 25 to regulate the discharge temperature to a fixed reference discharge temperature value set into the control by the maintenance operator. In the present invention additional sensors 26 are installed in both the HVAC and PH systems to provide both redundant sensing of system parameters monitored by the site controls, in addition to the sensing of newly selected system parameters, and provides the sensed information to a central control 27. As described in detail hereinafter, the central control 27 is connected to the HVAC and PH systems 16, 17 through interface apparatus 28, 29 installed in the respective control lines 21, 25, each selectably operable in either of two operating states to permit selectable control over the HVAC and PH systems through either the site controls 20, 24, or the central control 27.

In a preferred embodiment, the central control 27 is substantially identical to that disclosed by Games and Healey, and provides direct digital control over the HVAC air handler 17 and PH heating apparatus 22 when the central control is selected. As described in detail hereinafter, the central control may include a digital, central processing unit (CPU) located at some distance from the facility or building in which the HVAC and perimeter heating systems are installed, in combination with a remote microprocessor (RMP) installed in the building enclosure. The RMP provides signal conditioning and storage of the sensed parameter signals from the sensors 26 in addition to providing data compacting and front end processing of the sensed signals prior to transmission to the CPU. The RMP transmits the signal information to the CPU on request. The CPU compares the sensed signal information with stored values and computes temperature reference signals for both systems, each having OCCUPIED and UNOCCUPIED values at different selected temperatures. The temperature reference signals may include hot and cold deck reference discharge temperatures for the air handler 17, space heat and cool set point references for the living spaces within the building, and discharge temperature reference signals for the PH heating apparatus 22, and are computed in the CPU using programmed proportional and integral gain constants whose values may be reprogrammed to accommodate changes in each of the systems' operating conditions. The reference signals are transmitted back to the RMP which compares each reference value with the actual sensed value of the associated parameter, to provide inner loop proportional gain control over the associated control device within the HVAC systems, i.e. the system heating and cooling valves and damper actuators, and within the PH system, i.e. regulation of steam valve position, fuel valve position for fossil fuel fired heaters, or current regulation for electrical heating apparatus. The result of the combination of CPU and RMP control is an inner loop proportional gain control over the HVAC air handler and PH heating source provided by the RMP, and an outer loop proportional plus integral gain control provided by the CPU.

Figure 1:
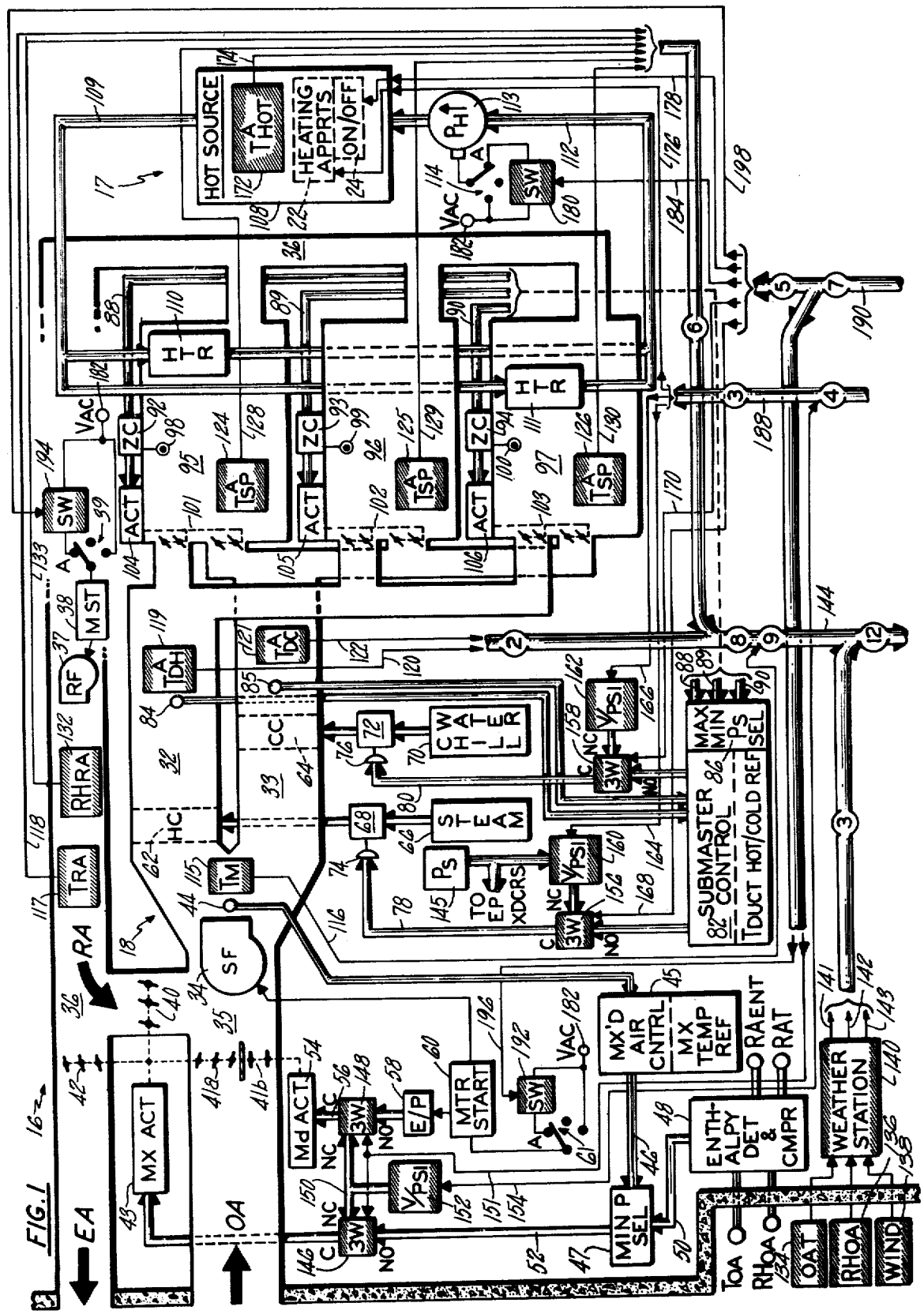
FIG. 1 is a schematic block diagram of an HVAC system and perimeter heating system for providing temperature regulation within a living space, together with installed interface apparatus for control and sensing of HVAC and perimeter heating system performance, in accordance with the control system of the present invention.

Referring now to FIG. 1, in a typical prior art dual duct type of HVAC system 16, an air handler 18 includes a hot deck 32 and cold deck 33 each provided with airflow from a system supply fan (SF) 34 which forces mixed air from a chamber 35 through the two decks. The chamber 35 receives conditioned return air (RA) from the temperature controlled spaces through a return air deck 36. In some systems the RA is forced through the duct by a return air fan (RF) 37 under the control of a motor start circuit 38 and manually operated switch 39, and is presented to the chamber 35 through an RA damper 40. The chamber 35 also receives outside air (OA) presented through OA dampers 41a, 41b, which together with a set of exhaust air (EA) dampers 42 are position controlled by a pneumatic, mixed air damper actuator 43, which may typically comprise three separate actuators, one for each damper set, each pneumatically synchronized such that the position of the dampers 41a and 40 are inversely proportioned, whereas the position of the dampers 41a and 42 are directly proportioned. The dampers 41b are the minimum OA dampes which provide, when opened, a determined minimum percentage of OA to the HVAC living spaces. In the prior art system, the dampers 41b are not position modulated, but are either opened fully or to some manually adjustable percentage of full open whenever the supply fan 34 is on, and full closed when the fan is off, without consideration to the occupancy status of the living spaces.

The actuator 43 provides position control of the dampers 41a, 40 to allow the air within the chamber 35 to include 100% OA, a combination of RA and some minimum OA, or any proportional ratio therebetween. The mixture of air within the chamber 35 is determined by a proportional gain closed loop control which includes a sensor 44 which presents a sensed temperature signal for the discharge air from the chamber 35 to a mixed air controller 45, which compares the sensed temperature with a mixed air temperature reference and generates a pneumatic error signal proportional to the difference therebetween. The error signal is presented through a pneumatic line 46 to a minimum pressure selector 47 which compares the signal on line 46 with the signal provided through an OA enthalpy detector 48. The enthalpy detector 48 provides an inhibit to the mixed air control loop by providing a minimum pressure signal on a line 50 in response to an OA enthalpy greater than the inside enthalpy which makes use of the OA undesirable. The selector 47 presents the minimum signal from the line 50 through a line 52 to the actuator 43 which responds by closing damper 41a and opening damper 40. In the absence of an inhibit signal on the line 50, the error signal on the line 46 is presented through the selector 47 and line 52 to the actuator 43, which responds to the error signal to provide a proportional positioning of the dampers 41a, 40 and 42 to attempt to achieve the desired mixed air temperature within the limitation of the droop error band.

The position of the minimum dampers 41b is controlled by an actuator 54 in response to a discrete pneumatic signal on a line 56 which either causes the actuator to position the dampers in an open or full closed position. In the prior art HVAC system, the signal on the line 56 is provided directly from an electropneumatic (EP) transducer 58 which is responsive to an electrical signal from a motor start circuit 60 under the control of a manual switch assembly 61, and which indicates the energizing or deenergizing of the supply fan 34. The dampers 41b are closed whenever the supply fan 34 is deenergized.

The hot and cold decks 32, 33 include respective heat and cool sources, such as a heating coil 61 and cooling coil 64. The heating medium for the heating coil 62 may be steam provided from a source 66 through a valve 68, and the cooling medium may be chill water presented from a source 70 through a similar type valve 72. The valves 68, 72 are controlled by pneumatic actuators 74, 76 each responsive to pneumatic control signals presented through lines 78, 80 from a submaster control 82, which provides position control of the valves 68, 72 from full closed to full open to attempt set control of the hot and cold deck discharge air temperatures monitored by sensors 84, 85. The controller 82 provides hot and cold deck reference temperatures in response to the hottest and coldest sensed space temperatures presented through a max/min pressure selector 86 which receives all of the sensed spaced temperatures on pneumatic lines 88–90 from individual space thermostats, (or controllers) 92–94. The thermostats compare the sensed temperatures of spaces 95–97 provided by sensors 98–100, with the desired temperature set into the thermostat by the human occupant. The spaces receive a mixture of hot and cold discharge air through associated sets of space dampers 101–103, each set including a hot damper and cold damper which are inversely positioned such that either full hot, full cold, or a proportional mixture of both is presented to the space. The dampers are controlled by pneumatic actuators 104–106 in response to the error signals from the thermostats 92–94 on the lines 88–90.

The perimeter heating system 17 includes a heat source 108 of a type known in the art, such as a hot water source which provides hot water at a determined discharge temperature through a supply line 109 to each of a plurality of hot water heaters 110, 111 (spaced heaters 23 to FIG. 4), such as hot water radiators, installed in several selected living spaces located along the outside perimeter of the building. As known, the perimeter heating provides supplementary heating to overcome the cold wall effect associated with the perimeter living spaces which are subject to more severe temperature gradients due to outside air temperature (OAT) and wind (W). In FIG. 1 the heaters 110, 111 are shown installed in living spaces 95, 97, and each are returned to the heat source through a return line 112 and a hot water pump 113. The pump 113, of a type known in the art, provides circulation of the hot water through the lines 109, 112 and heaters 110, 111, and is typically energized through a manually operable switch 114 from an AC source.

So far the description has been that of a prior art HVAC and perimeter heating system which together provide temperature regulation in one or more living spaces within a building enclosure. In the HVAC control system of the present invention, the existing HVAC and PH systems are interfaced with the sensors and central control (26, 27, FIG. 4) at selected control and sensed parameter locations. In FIG. 1 the added interface components are shown shaded for clarity of illustration and include, but are not limited to, the following components. Temperature sensors of a type known in the art such as resistance temperature sensors comprising ultraprecision nickel wire for measuring the temperature in the hot and cold decks and the indoor/outdoor free standing air over a typical temperature range of from $-40°$ to $+250°$ F., with a temperature coefficient of $+13$ ohms per degree F. The temperature sensors include a mixed air sensor ($T_M$) 115 connected to a line 116, a return air sensor ($T_{RA}$) 117 connected to a line 118, a hot deck discharge temperature sensor ($T_{DH}{}^4$) 119 connected to a line 120, a cold deck discharge temperature sensor ($T_{DC}{}^4$) 121 connected to a line 122, and space temperature sensor ($T_{sp}{}^4$) 124–126 connected to lines 128–130. The temperature sensors are located within the HVAC system generally as illustrated in FIG. 1. Further sensors include a return air, relative humidity sensor ($RH_{RA}$) 132 connected to a line 133, an outside air (OA) temperature sensor 134, an OA relative humidity ($RH_{OA}$) 136, and an OA average wind sensor ($W_S$) 138, the last three being mounted outside the building structure. The outside air temperature, relative humidity and average wind speed sensed signals are presented to a weather station 140 of a type known in the art, such as the Texas Electronics Series 3000 modular meteorological system, which provides the OA sensed signals on lines 141–143. The signal lines 116, 118, 120, 122, 128–130, 133 and 141–143 are presented through a conduit, or trunk line 144 to an input of a remote microprocessor (RMP), described hereinafter.

The control interface between the central control and the existing HVAC system is made by installing electropneumatic (EP) transducers in combination with three-way valves in the pneumatic control lines of various HVAC system actuators and valves. The three-way valves are of the type well known in the art, such as the Johnson Controls Model V24, and are selectably operable in one of two positions from a common (C) port to either a normally closed (C) or a normally open (NO) port. Each three-way valve is installed in the corresponding pneumatic control line in such a manner as to provide connection of the existing pneumatic line between the C and NO ports and the NC port is connected to the pneumatic output line of the associated EP transducer. The instantaneous position of the three-way valve is determined by the energizing of a solenoid within the valve assembly with a typical energizing voltage of 24 volts AC which is presented to the solenoid in response to the presence of a discrete energizing signal from the RMP. In the presence of a discrete energizing signal at the input of the threeway valve, a pneumatic pressure signal path is provided between the normally closed (NC) and common (C) ports, i.e. the output of the EP transducer and the input to the controlled device. This allows for a "fail safe" operation in that a failure in the RMP provides restoration of the three-way valve pneumatic signal path to the common and normally open (NO) ports restoring control to the existing HVAC system. The EP transducers are similarly of a type known in the art, such as the Hammeldahl Model T15. The transducers are charged from the existing system pressure source ($P_S$) 145 to provide an operating pneumatic pressure signal in a typical range of 0–20 psi in response to an analog voltage signal from the RMP within a determined input analog voltage range.

The control of the HVAC mixed air is provided by installing three-way valves 146, 148 in the pneumatic control lines 52, 56 of the mixed air actuators 43 and min damper actuator 54 respectively. The C and NO ports are connected to the existing pneumatic lines as shown, and the discrete switching signal is presented to each valve on a line 151 from the RMP. The NC port of each valve is connected through a pneumatic line 150 to the pneumatic output of a common EP transducer 152 which receives an analog electrical signal input on the line 154 from the RMP. The two actuators are driven with the common pneumatic signal from the transducer 152. Typically, the min dampers 41b provide approximately twenty-five percent of the total OA flow when full opened, the dampers 41a providing the remaining flow. Depending upon the particular HVAC system, each damper set may respond in tandem to a different range of pressure signals within the 0-20 psi range (i.e. a min damper range of 3-8 psi and a max damper range of 8-13 psi), or may overlap such that each responds simultaneously to a common portion of the total pressure range (min damper range of 3-10 psi and max damper range of 3—13 psi). Although not shown due to drawing limitations, the EP transducers 152 is connected to the system pressure source ($P_S$) 145.

Control of heating and cooling coils 62, 64 is provided by installation of three-way valves 156, 158 in the pneumatic control lines 78, 80 to the steam and chill water valve pneumatic actuators 74, 76. The valves are installed with the existing pneumatic line connected to the C and NO ports. The NC ports of the valves 156, 158 are connected to the pneumatic output of EP transducers 160, 162 which are connected to the souce $P_S$ 145, and which receive input analog voltage signals from the RMP on the lines 164, 166, respectively. The three-way valves 156, 158 are selectably operable in dependence on a discrete voltage signal presented through associated lines 168, 170 from the RMP, each having its own discrete signal input to provide flexibility in control over either or both the heating coil and cooling coil. It should be noted that in certain types of HVAC systems, the steam and chill water valve actuators 74, 76 are driven from a common pneumatic line, each responding to a different portion of the total psi range. In such systems, the central control of the present invention would interface with the actuators through a common EP transducer and three-way valve.

Control of the PH system includes control over the hot source 108, both actuation and discharge temperature modulation, and also controlled actuation of the hot water pump 113. The interface apparatus includes the addition of a discharge temperature sensor 172 installed in the hot source 108 to provide an actual sensed hot water discharge temperature ($T_{hot}4$). The temperature sensor is of the type known in the art and provides an actual sensed discharged temperature signal on a line 174 which is presented to the RMP through the common trunk line 144. The interface apparatus required to provide the controlled actuation and modulation of the discharge temperature from the hot source is dependent on the particular type of heating apparatus 22 included in the source. The hot source, if a hot water type supply, may use a number of known methods for heating the hot water to the desired discharge temperature, i. e. steam heating of the hot water, or alternatively, heating the hot water through the use of electrical or fossil fuel fired heaters. The control of the heating apparatus within the source therefore varies in dependence on the type of heating apparatus used, and may include the position modulation of a steam valve for regulating the steam input to the source, position modulation of a feeder providing fuel oil, or the regulation of current flow through an electrical heater. In all cases, since the heating apparatus used within the hot source is of a type well known in the art, the method of controlling the operation of the heating source is similarly well known, such that the illustration of the interface with the heating source is a generic, or block diagram illustration. In addition to providing the linear control over the modulation of the discharge temperature from the source the CPU also provides discrete control over actuation of the heating source, such that a complete turn off of the source may be accomplished remotely from the CPU. The connection between the RMP and the heating apparatus includes an analog signal input to the heating apparatus on a line 176 and a discrete electrical signal, to control actuation of the source, on the line 178.

Interface with the hot water pump 113 is provided through a voltage controlled switch 180 which is interconnected between an AC voltage source 182 and an automatic (A) contact on the manually operated switch 114. The voltage controlled switch is of a type known in the art which provides electrical connection between the source 182 and the A contact of the manually operated switch in response to a discrete electrical signal, or gate signal, presented on a line 184 to a gate input thereof. With the manual switch 114 positioned in the A contact location, the CPU may provide selectable actuation of the pump 113.

The analog signals to the EP transducers on the lines 154, 164, and 166, in addition to the analog signal input to the heating apparatus of the hot source 108 on the line 176 are presented from the RMP on a common trunk line 188. Similarly, the discrete voltage signals to the three-way valves on the lines 151, 168, and 170, in addition to the discrete actuation signal presented to the hot source 108 on the line 178, are presented from the RMP on a common trunk line 190.

In addition to the sensors and interface control apparatus described hereinbefore, control over the operating state of the supply fan 34 and the return air fan 37 are provided through voltage controlled switches 192, 194, identical to the switch 180, which provide electrical connection between the AC voltage source 182 and a selectable automatic (A) contact position on each of the manual switches 39, 61. The switches 192, 194 provide the interconnection in respose to discrete gate signals presented to gate inputs thereof, on lines 196, 198 which are also presented from the RMP on the common trunk line 190.

The interface apparatus shown in FIG. 1 is not necessarily inclusive, such that additional interface and sensing apparatus may be provided as deemed necessary. The interface apparatus shown in FIG. 1 represents the minimum required to provide control of the HVAC multi-zone system according to the present invention.

As stated hereinbefore, the central control (27, FIG. 4) may include a CPU and RMP in combination, with the RMP located within the building and the CPU located at some remote station. The RMP signal conditioning and analog-to-digital transformation of the analog sense signals, storage of the sensed signal values in a random access memory (RAM) of the RMP between update intervals, and reads out a selected one or all of the stored parameter values to the CPU upon request. If the CPU were located within, or in close proximity to, the building then the use of the RMP may not be required since all of the functions performed by the RMP may be provided in the CPU itself, however, the use of a small RMP to provide front end data processing and interim storage, in addition to providing direct control of the various dampers and valve positions, is preferred since it allows a freeing up of the CPU which reduces the actual computer time, and allows the CPU to perform other tasks. Although the use of an RMP in combination with the CPU is preferred, its use is dependent upon the particular implementation of the present invention and may be found to be unnecessary.

Figure 2:
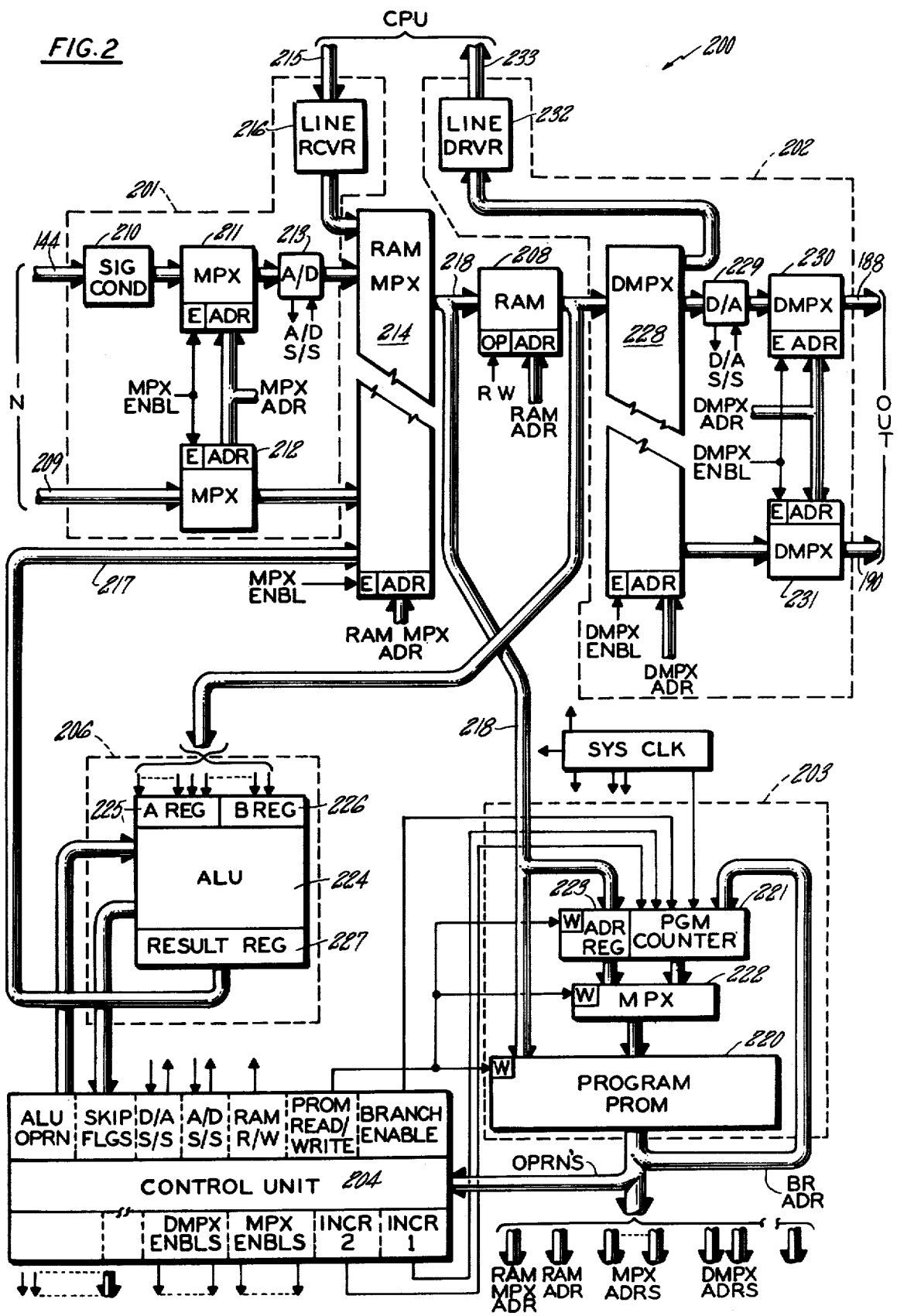
FIG. 2 is a simplified, schematic block diagram illustration of a microprocessing system as may be used with the present invention.

Referring now to FIG. 2, an RMP 200 which may be used to implement the control system of the present invention is illustrated as having the architecture of a typical digital microprocessor system. The RMP is a combination of basic microprocessor elements including: input, output sections 201, 202 for receiving and transmitting data to the HVAC and PH systems and the CPU; a main memory section 203 for providing programmed instructions for the RMP through operand address programming; a control unit 204 for providing program control over RMP operation sequencing; and arithmetic unit 206 for providing the operational add, subtract, multiply, and divide functions of the RMP; and a random access memory (RAM) 208 for providing memory storage of the interim and final result outputs from the arithmetic unit 206 and for all signal information from the input section 201, including sensed HVAC and PH data and CPU instructions commands.

The input section 201 receives the analog sensed signals from the HVAC and PH systems on the trunk line 44, in addition to any discrete signals from the systems, such as temperature alarm units and pneumatic line ΔP limits, on a line 209. The analog signals on the line 144 are presented through signal conditioners 210 to the input of a multiplexer (MPX) 211 and the discrete signals on lines 209 are presented to the input of an MPX 212, both MPX's being under program control from the programmable memory 203. The output of the MPX 211 is presented to an analog-to-digital (A/D) converter 213 which exchanges start/stop commands with the control unit 204. The output of the A/D 213 and MPX 212 are presented to inputs of a RAM MPX 214 which also receives CPU signal information presented from the line 215 through a line receiver 216, in addition to the output from the arithmetic unit 206 on lines 217. The MPX 214 scans each of the input lines under a RAM MPX program address from memory 203 on command of MPX strobes generated by the control unit 204, and presents the information at each input through lines 218 to the RAM 208, which stores it in a memory location defined by the RAM address programming from the main memory. In addition, the output from the MPX 214 on the lines 218 is presented to the input of the main memory 203 to provide, under command of a program subroutine, access by the CPU to the main memory 203 for reprogramming the RMP operational instructions stored in the main memory.

The main memory section 203 includes a programmable read only memory (PROM) 220 normally responsive to the output of a program counter 221 presented through an MPX 222. The PROM 220 may actually comprise a read/write memory so as to be alternatively responsive to CPU interrupt or reprogramming instructions presented on the lines 218 to another input of the PROM 220 and to an address register 223, connected through the MPX 222. The PROM 220 provides operand address programming for the RAM MPX 214, the RAM 208 address, and the program address for the multiplexers and demultiplexers (MPX, DMPX) of the input and output sections 201, 202. In addition the PROM 220 provides the operand addressing to the control unit 204 and the branch address to the program counter 221.

The arithmetic unit 206 includes an arithmetic logic unit (ALU) 224 which performs the selected mathematical function on the data presented from the RAM 208 through the operating A and B registers 225, 226. The result of the ALU operation is presented through a result register 227 to the input of the RAM MPX 214. The ALU operation (add, subtract, multiply, or divide) is selected by the control unit 204, and the RAM operand address, which controls the data presented to the ALU from the RAM, is provided from the PROM. As may be required, SKIP FLAGS are generated by the ALU and presented to the control unit to provide PROM skip instructions as may be necessary during the particular mathematical operation being performed. The result data stored in the RAM 208 is presented to the CPU and to the HVAC system (on CPU request or PROM 220 program command) through a demultiplexer (DMPX) 228 which, under program control from the PROM 220 presents the HVAC analog command signals, i.e. the input signals to the EP transducers of FIG. 1, through a digital-to-analog converter (D/A) 229 and DMPX 230 to the lines 154, 164, 166, 180, 181 and 182 within the trunk line 188 (FIG. 1), the HVAC discrete signals through a DMPX 231 to the lines 151, 168, 170, 184–186, 196, and 198 within the conduit 190 of FIG. 1, and the data output to the CPU through a line driver 232 and lines 233. Both DMPX's 230, 231 are under program control from the PROM 220 and the D/A 229 exchanges start/stop strobes with the control unit 204.

In operation, as known to those skilled in the art, the MPX 214 reads all of the input data to the RMP 200 into the RAM 208 where it is stored at address locations determined by a RAM address program from PROM 220. The PROM scans and identifies all data entries to the RAM, both sensed HVAC and PH systems parameter information and inputs from the CPU, by ordering both stored data and stored control character code information from the RAM 208 into the A and B registers 225, 226 of the arithmetic unit 206. A PROM program subroutine then sequentially compares identifying characters contained within selected bytes of the information word with each of a plurality of identifying characters within the character code until the information work is identified. Depending upon the identification of the information word, the program may branch to various addresses as determined from the PROM 220 and the word may be returned to the same location in RAM or changed to a different address location. This may be accomplished through SKIP FLAGS dependent on results in the ALU 224 and presented to the control unit 204. A SKIP FLAG causes the program counter to increment two steps, such as to bypass a branch instruction; no SKIP FLAG causes an increment of one, allowing execution of the next sequential instruction (operational or branch). Use of various branch instructions enables the program to unconditionally branch to an address stored in PROM 220, to call up various subroutines as required for the program operation during normal running of the RMP.

The RMP includes a subroutine for identifying CPU program change instructions, wherein a first word from the CPU is presented through the MPX 214 into a RAM 208 memory location determined by the address program. The word is identified by the normal PROM scanning of the stored RAM data through the subroutine described hereinbefore. When identified as a CPU instruction, a PROM write strobe from the control unit 204 is presented to the address register 223 allowing entry into the register of the next word from the CPU appearing on the line 218 and containing the desired address location in PROM 220 of the new CPU instruction. A third word from the CPU, containing the instruction change information, is presented from the lines 218 to the input of the PROM 220 simultaneously with the presentation of a second PROM write strobe from the control unit 204 to the MPX 222 which allows the PROM 220 to read the address location stored in the register 223 together with the instruction word appearing at the input on the line 218. In this manner operating program instructions stored in the PROM 220 may be altered by CPU command. Similarly the values of operating constants for the inner loop control of the HVAC and PH systems, which are stored in the RAM 208, may similarly be changed on CPU instruction which orders the PROM 220 to pull out the appropriate constant stored in the RAM 208 and read in the new value of the constant from the CPU.

The RMP 200 is free running, i.e. asynchronous with the CPU, and scans the sensed analog and discrete input signals from the input section 201 at a rate typically ten times greater than that required by the CPU, i.e. typically the CPU receives data from the RMP every 10 seconds, and the RMP scans all of the data input lines and closes each of the proportional gain inner control loops every one second. The normal free running scan of the sensed parameters is interrupted for communication with the CPU, for both program change commands and commands for data read out from the RAM 208. The interrupt time represents approximately 5% of the total RMP running time. The CPU also interrupts the RMP to provide loading of CPU calculated temperature reference values into the RAM 208, to command the RMP 200 to provide comparison of the duct reference temperature with the stored sensed temperature values, and to generate the resultant error control signal to the appropriate valves and damper actuators within the HVAC and PH systems. The control procedures for the RMP 200 is stored in the PROM 220 while the RAM 208 stores both the sensed data and control character code subroutine information, in addition to providing scratch pad storage for the arithmetic unit 206. Similarly, specific data acquisition software, i.e. unique configuration tables for a specific control loop is loaded from the CPU and is stored in the RAM 208. Memory capacity for the RMP is typically 2K words of PROM and 4K words of RAM. In addition to providing the data acquisition from the HVAC system sensors and proportional inner loop control of the HVAC control devices, the RMP also provides a program shutdown routine stored in the PROM 220 for relinquishing control from the CPU to the existing HVAC and PH systems site control loops. It should be understood that the RMP of FIG. 2 is illustrative of one configuration of a dedicated microprocessor system suitable for providing the data acquisition and front end processing of data for the CPU, and the specific architecture is dependent on a given particular implementation of the present invention and forms no part of this invention. Similarly, any suitable general purpose microprocessor known in the art and having the requisite characteristics, such as the industry standard model 8080A, may be used if desired with standard programming techniques.

Figure 3:
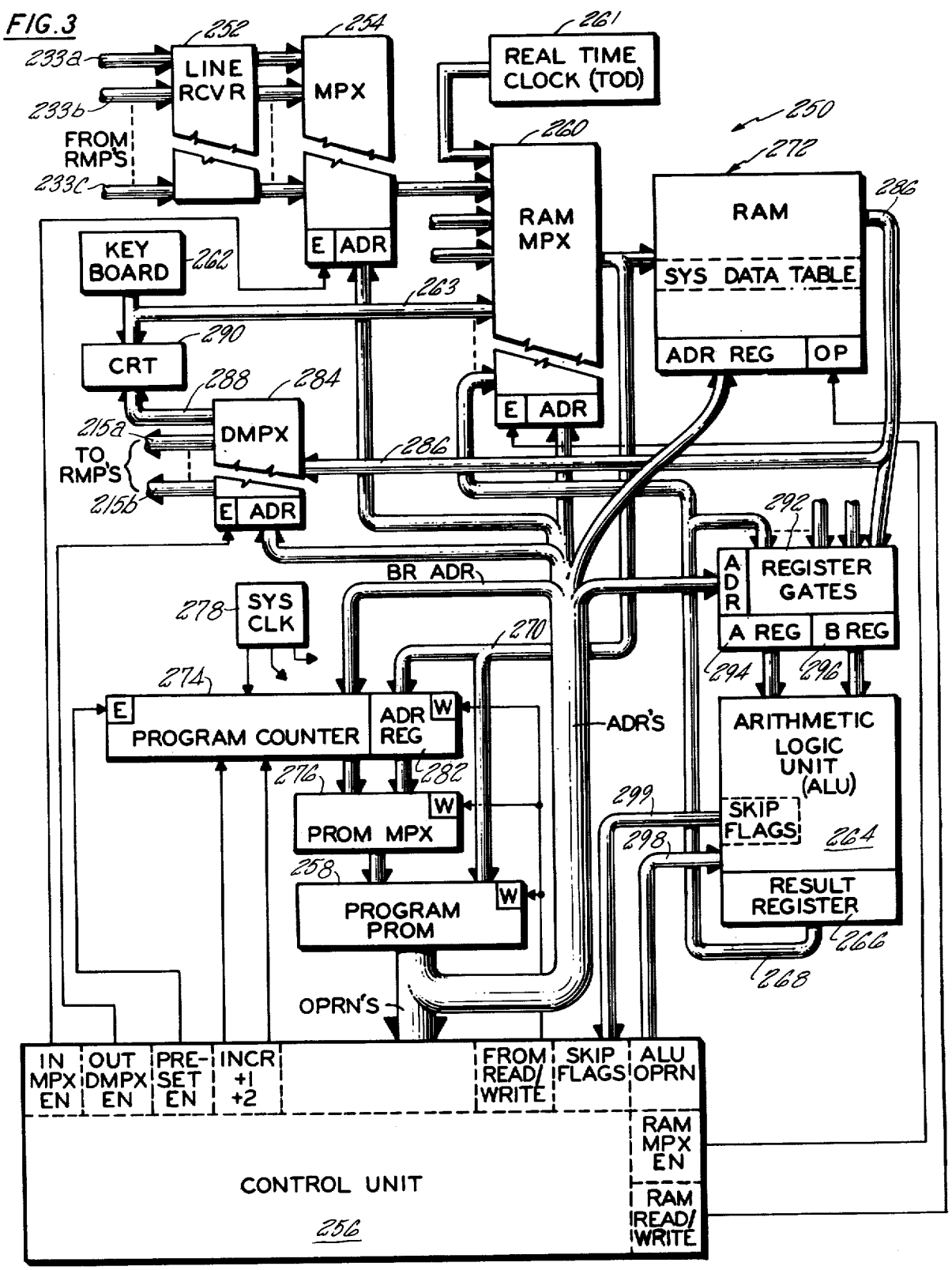
FIG. 3 is a simplified, schematic block diagram illustration of a real time digital processing system as may be used with the control system of the present invention.

Referring now to FIG. 3, a system which may incorporate the central control function of the present invention is illustrated as representing the architecture of a typical, real time data processing system 250. Input data lines 233a-233b from each of a plurality of RMPs, such as the RMP 200 of FIG. 2, are presented through line receivers 252 to a corresponding one of a plurality of inputs of an MPX 254 which, when enabled by a strobe from a control unit 256, sequentially scans the input lines under address program control of a programmable read only memory (PROM) 258. Each of the input data signals are presented in turn through lines 259 to one input of a RAM MPX 260 which scans a plurality of RAM input data lines including: the output of from a real time clock 261 which provides the time of day (TOD) with a timekeeping capability ranging from seconds to years, the output of a keyboard 262 presented through lines 263, and the output of an arthmetic logic unit (ALU) 264 presented through a result register 266 and a set of lines 268. The RAM MPX 260 scans each of the input lines when enabled by a strobe from the control unit 256 under address control from the PROM 258, and presents the selected input data lines through a set of lines 270 to the input of a RAM 272 and to a write input of the PROM 258. The RAM 272 is similarly under an address program control from the PROM 258 receives an operational code strobe (RAM READ/WRITE) from the control unit 256.

The control unit 256 responds to command inputs from the PROM 258 which in turn is under control of a program counter 274 presented through a PROM MPX 276. The program counter 274 receives the output of a system clock 278 which provides the CPU operating time base. The program counter 274 is also responsive to pre-set enable, and increment one, and increment two strobes from the control 256. The PROM MPX 276 is responsive to read/write control signals from the control unit 256 to present either the output of the program counter 274, or alternatively the output of an address register 282 to the input of the PROM 258. The address register 282 receives the output of the RAM MPX 260 on the lines 270 and is used in conjunction with a subroutine similar to that described hereinbefore with respect to the RMP 200 of FIG. 2, to provide reprogramming of the PROM 258 through keyboard 262 entry by a maintenance operator.

In addition to providing the address programming for the MPX's 254, 260 and the RAM 272, the PROM 258 also provides operational address programming for a demultiplexer (DMPX) 284 which presents the output from the RAM 272 on lines 286 to a plurality of output lines including lines 288 to a video display (CRT) 290 which provides visual display of input information presented through the keyboard 262 by the operator and output data presented to the RMP from the CPU, and lines 215$_a$–215$_b$ to the RMPs. The PROM 258 also provides the branch address to the program counter 274 and program address information to address register gates 292 which control the data flow into the A and B registers 294, 296 of the ALU 264.

The stored program within the PROM 258 is implemented through the control unit 256 which provides enabling strobes for the CPU multiplexers and demultiplexers in addition to providing operative read/write instructions to the RAM 272 and operation instructions (arithmetic, logic, compare, etc.) to the arithmetic unit 264 on lines 298. The control unit 256 receives instruction inputs to alter the PROM sequency from SKIP FLAGS generated in the ALU 264 and presented on the lines 299.

The real time data processing system of FIG. 3 represents one configuration of a dedicated hardware, real time data processing apparatus which may be advantageous for use in implementing the control system of the present invention where general purpose programming is neither required nor practical in view of the control functions to be performed. It should be understood, however, that the specific architecture is dependent on the particular implementation of the present invention, and forms no part of the present invention. If it is deemed necessary, or practical, any one of a number of well known processing systems may be used as may be obvious, or readily apparent, to those skilled in the art. As is more apparent in the light of detailed operational descriptions provided hereinafter, well known processing systems such as the Digital Equipment Corporation model PDP 1135 or 1140 general purpose computers used in combination with real time operating software such as the Digital Equipment Corporation RSX-11M real time software system, employing only programs provided through programming techniques well known in the art, may be utilized in conjunction with the remote microprocessor and the HVAC sensors and interface control equipment described hereinbefore.

The present invention provides control functions for optimizing the operation of the HVAC and PH systems during the unoccupied periods to reduce the overall energy consumption of the systems to the absolute minimum required to prevent freeze up and overheat conditions in the spaces. This is accomplished through constant monitoring of actual space temperatures, and scheduling the actuation of both systems on a priority basis in dependence on the deviation of the actual space temperatures from set-back temperature reference values selected in dependence on the insulation and structural characteristics of the particular building. The priority scheduling includes: (1) a shutdown of both the HVAC and PH systems as long as the actual space temperatures are within the prescribed set-back temperature limited, (2) the first actuation of the PH system as the primary source of heating the unoccupied spaces when required to maintain the spaces to the set-back temperature reference limits, the control functions including both actuation of the system and modulation of the hot source discharge temperature as required to maintain the unoccupied temperature regulation within the spaces, (3) actuation of the HVAC system only as required to supplement to the PH system, or if the particular building has no perimeter heating then actuation of the HVAC as the primary source of heating to prevent freezing, (4) the use of nighttime outside air as the primary source of cooling the unoccupied living spaces; (5) actuation of the HVAC system to provide cooling if required to supplement the outside air cooling, or if the outside air temperature and enthalpy conditions are not satisfactory, and then only to the extent necessary to prevent overheating of the spaces and (6) an optimum start-up procedure which accelerates the heat-up of the spaces from the set-back reference temperatures to the occupied reference temperature values through the combined actuation of the HVAC and PH systems, and a maximum PH system hot source discharge temperature allowing for regulation of the living spaces to the set-back temperatures for an extended period of time thereby conserving energy while ensuring adequate space ambient temperature conditions prior to occupancy.

Figure 5:
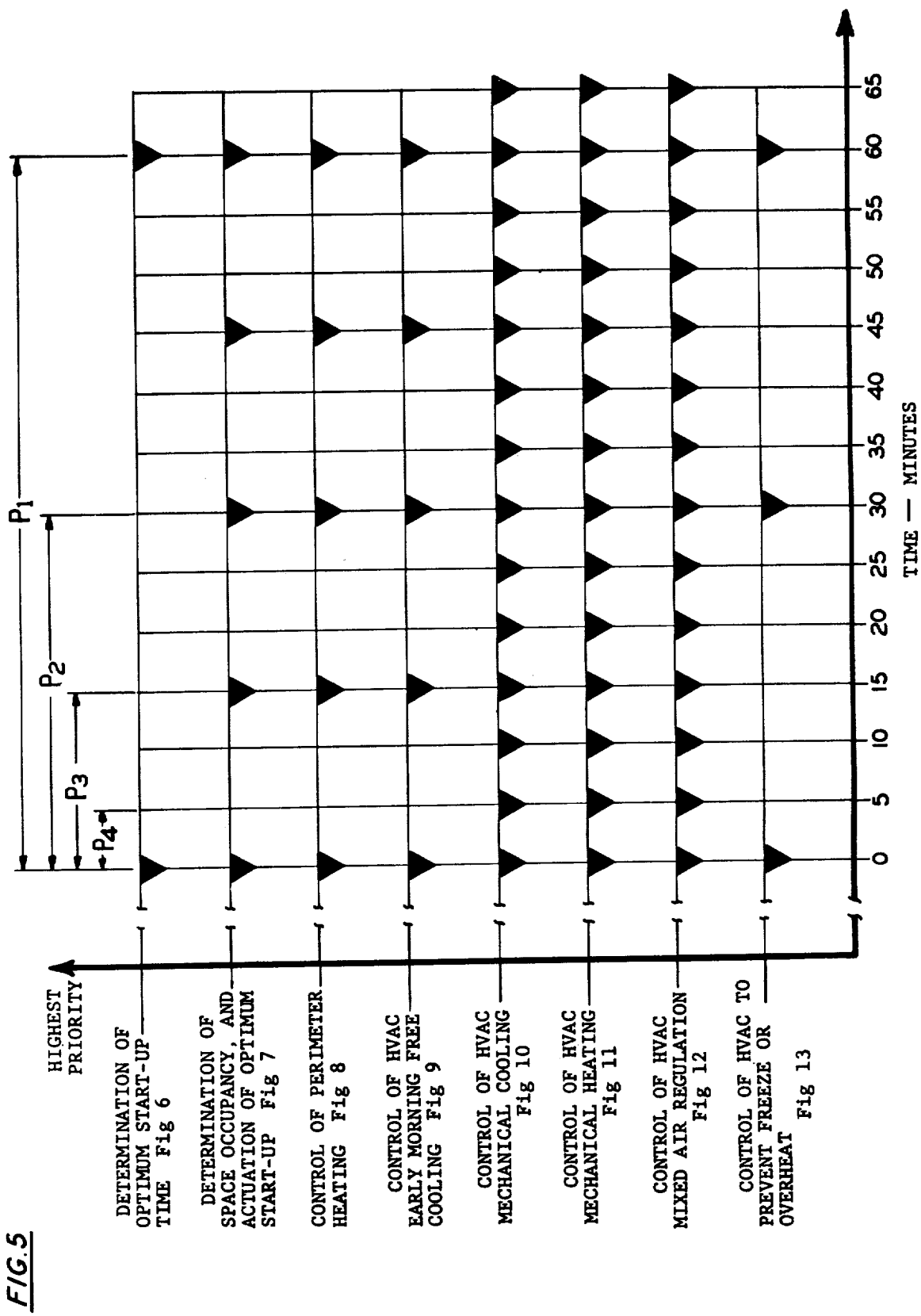
FIG. 5 is a timing diagram illustration of the various control functions provided by the control system of the present invention.

These optimization control functions are provided by the CPU, and RMP in combination, through several programmed routines. These functions are illustrated in the flow charts of FIGS. 6–13, each executed in a determined priority order at periodic intervals, or repetition rates, the interval time period of each being dependent on the function performed by the routine. Referring to FIG. 5, which is an illustration of the priority scheduling of the flow charts of FIGS. 6–13 together with the relative periodic intervals of each. The ordinate of the graph illustrates the priority with the highest priority assigned to the flow chart of FIG. 6 entitled DETERMINATION OF OPTIMUM START-UP TIME, and extending to the lowest priority flow chart of FIG. 13, entitled CONTROL OF HVAC TO PREVENT FREEZE OR OVERHEAT. The abscissa of the graph illustrates the interval time period of each flow chart, which are grouped in four periods $P_1$–$P_4$ having typical values of $P_1 = 60$ minutes, $P_2 = 30$ minutes, $P_3 = 15$ minutes, and $P_4 = 5$ minutes.

Of the flow charts listed in FIG. 5, those relating to control of the HVAC mechanical cooling (FIG. 10), mechanical heating (FIG. 11), and mixed air regulation (FIG. 12) have the highest frequency, being executed at 5 minute intervals. The FIGS. 10–12 flow charts illustrate the HVAC system central control disclosed and claimed in the hereinbefore referenced application to Games et al, and the detailed description of each provided therein is expressly included by reference in this application. These flow charts are included in the present application to illustrate the interrelationship between the control function of the present invention and the central control function of Games.

Figure 6:
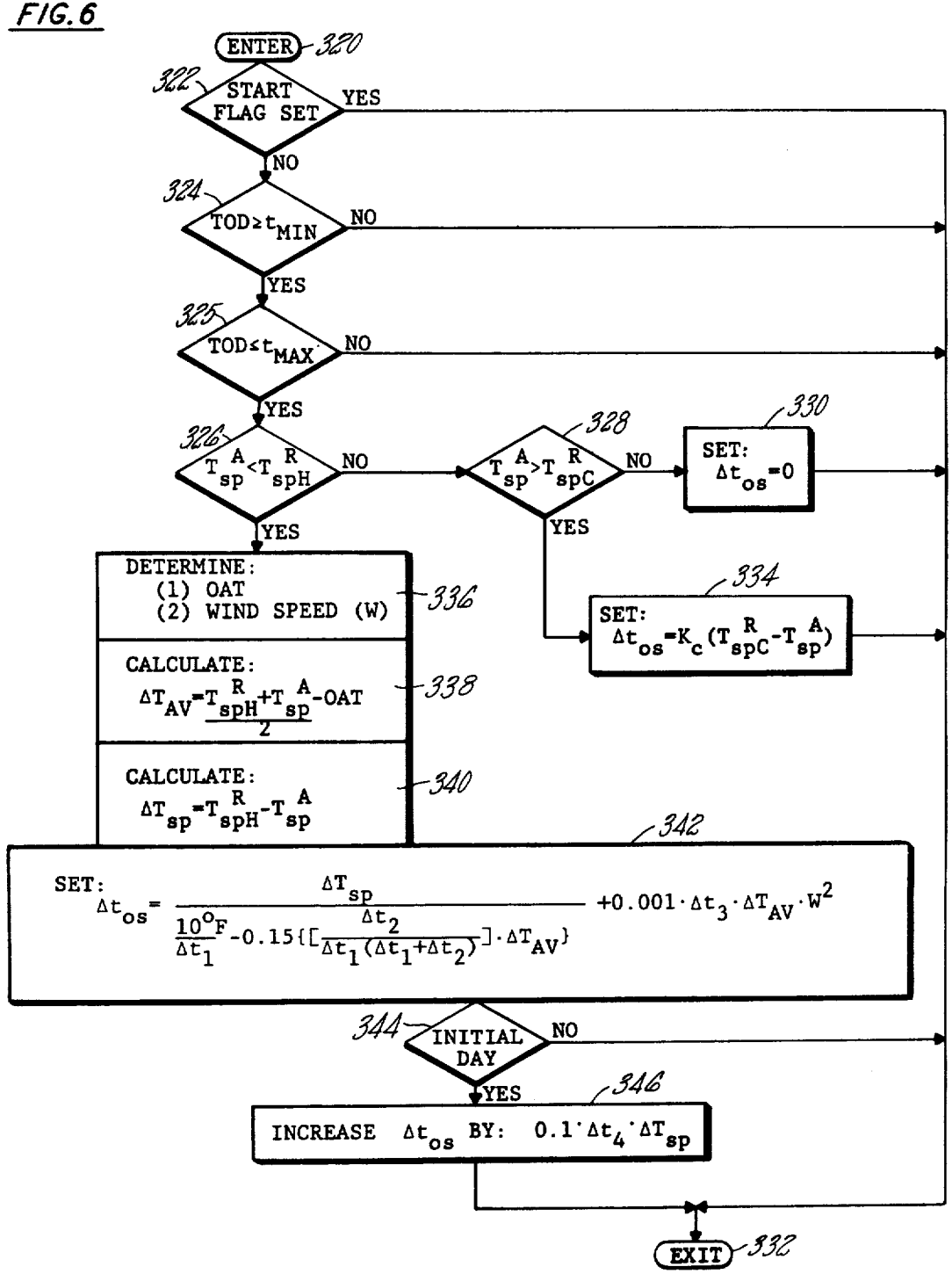
FIG. 6 is a logic flow chart diagram illustrating the processing steps incorporated in one of the control functions of the control system of the present inventon.

The flow chart of FIG. 6 determines the optimum start-up time interval ($\Delta t_{os}$) required to accelerate the ambient space temperatures from the set-back values to the temperature references provided for the occupied periods. The determination of $\Delta t_{os}$ is dependent on ambient temperature conditions inside the spaces and outside the building, the outside average wind speed (W), and whether or not the start-up is for an "initial day" i.e. a day scheduled for space occupancy following an extended number of unoccupied days, such as a Monday morning following a weekend in which the spaces were unoccupied. The CPU receives the information regarding outside air temperature (OAT) and average wind speed (W) from the sensed data stored in the RMP RAM (208 of FIG. 2) and provided by the weather station (140 of FIG. 1). Referring now to FIG. 6, in a flow chart illustrative of the CPU determination of $\Delta t_{os}$, the CPU enters the flow chart at 320 and instructions 322 determine if the START FLAG, which is a flag set by the CPU at the time that the optimum start-up program (FIG. 7) is initiated, is set. If set the CPU exits the flow chart since there is no present requirement to calculate a $\Delta t_{os}$. If the START FLAG is not set instructions 324, 325 determine if the present time of day (TOD) provided by the CPU real time clock (261 of FIG. 3) is within a time interval bounded by the limits $t_{min}$ and $t_{max}$, which defines a permissible start period in which the start-up procedure may be implemented. These instructions prevent the unnecessary calculation of the start-up value when not required. If the TOD is within the time interval instructions 326 request a determination of whether of not the actual space temperature ($T_{sp}^A$) of a selected one of the building living spaces is less than the space heat set point reference ($T_{spH}^R$). The particular living space is selected in dependence on the building layout and structural characteristics and is generally that space considered to be representative of the "worst case" temperature conditions. If the space temperature is not less, instructions 328 next request a determination of whether the sensed space temperature is greater than the space cool set point temperature reference ($T_{spC}^R$). The values of the space heat and cool set point temperature references are the occupied values, and if the actual sensed space temperature is within both set point limits instructions 330 request the CPU to set $\Delta t_{os}$ equal to zero and exit the flow chart at 332, since neither heating nor cooling is required prior to occupancy. If instructions 328 determine that the sensed space temperature is greater than the cool set point instructions 334 request the CPU to set $\Delta t_{os} = -K_C \cdot (T_{spC}^R T_{sp}^A)$, after which the CPU exits the flow chart. The term $K_C$ is a proportional gain constant in minutes/° F. which is selected in dependence on the building structural and insulation characteristics. A typical value for $K_C$ is 2 minutes/° F., but is changeable by the maintenance operator through keyboard (262 of FIG. 3) entry into the CPU.

If instructions 326 determine that the actual space temperature is less than the heat set point reference, such that HVAC mechanical heating is required, instructions 336 request a determination of the present values of OAT and W. Instructions 338 next request a calculation of a temperature error gradient signal ($\Delta T_{AV}$) between the average of the space heat set point temperature reference ($T_{spH}^R$) and the actual sensed space temperature values, and the outside ambient temperature, or:

$$\Delta T_{AV} = (T_{spH}^R + T_{sp}^A)/2 - OAT.$$

Instructions 340 next determine the space temperature error: $\Delta T_{sp} = T_{spH}^R - T_{sp}^A$, followed by instructions 342 which request the CPU to set the value of $\Delta t_{os}$ equal to the expression illustrated in the block of instructions 342. As shown, the equation for $\Delta t_{os}$ includes both fixed constants and variable $\Delta t$ constants (in minutes) having values which are selected by the operator in dependence on determined thermal gain and loss characteristics of the given building structure in response to selected inside and outside ambient temperature conditions and outside average wind speed. The values of $\Delta t_1$ through $\Delta t_3$ are selected with a knowledge of the building thermal response characteristics to each of the following specified environmental conditions: $\Delta t_1$ is the "base start-up time period" value required to heat the building living spaces by 10° F. from 58° F. to 68° F. for an OAT equal to 63° F., $\Delta t_2$ is the time increment increase in the base start-up time period required to heat the spaces by 10° F. for an OAT equal to −4° F., and $\Delta t_3$ is the time increment increase in the base start-up time period required to heat the spaces 10° F. when $\Delta T_{AV}$ is equal to 10° F., and the average wind speed is equal to 10 miles per hour. Each of these constants may be modified and reprogrammed into the CPU at any time by the operator, such that if the corresponding $\Delta t$ estimated value is found to be insufficient to provide a satisfactory $\Delta t_{os}$ value, it may be modified accordingly. Similarly for changes in the building thermal response characteristics due to structural changes, i.e. insulation, the corresponding values may be changed, each value being readily reprogrammable through entry into the CPU via the keyboard (261 of FIG. 3). The constant $\Delta t$ values are weighted in the expression for $\Delta t_{os}$ by the fixed constants including: the 10° F. constant, the 0.15 dimensionless constant, and the constant 0.001 (1/°F.-MPH$^2$), such that modification of any given $\Delta t$ constant does not alone provide a drastic change in the resultant $\Delta t_{os}$ value. This provides the maintenance operator with a readily workable expression for $\Delta t_{os}$ which allows him to simply program in the estimated values of the $\Delta t$ constants based upon his experience with the building thermal characteristics, and if subsequent use indicates that the $\Delta t_{os}$ value is insufficient the related one or more of the $\Delta t$ constants may be quickly, and simply modified through reprogramming.

Following the setting of the $\Delta t_{os}$ value in instructions 342, the set value is stored in the CPU RAM (260, FIG. 3) unless further modified in dependence on an initial day condition. Therefore, following instructions 342 instructions 344 request a determination of whether the present TOD precedes an initial day. If NO, the CPU exits the program and the $\Delta t_{os}$ value set by instructions 342 is stored in the RAM. If YES, instructions 346 next request an increase in the value provided in instructions 342 by the addition of the term $0.1 \cdot \Delta t_4 \cdot \Delta T_{sp}$. The value $\Delta t_4$ is the time increment increase in the base start-up time period required to heat the spaces by 10° F. following a prolonged unoccupied period extending of a period of days, and the fixed constant 0.1 (1/°F.) provides the appropriate weighting.

Figure 7:
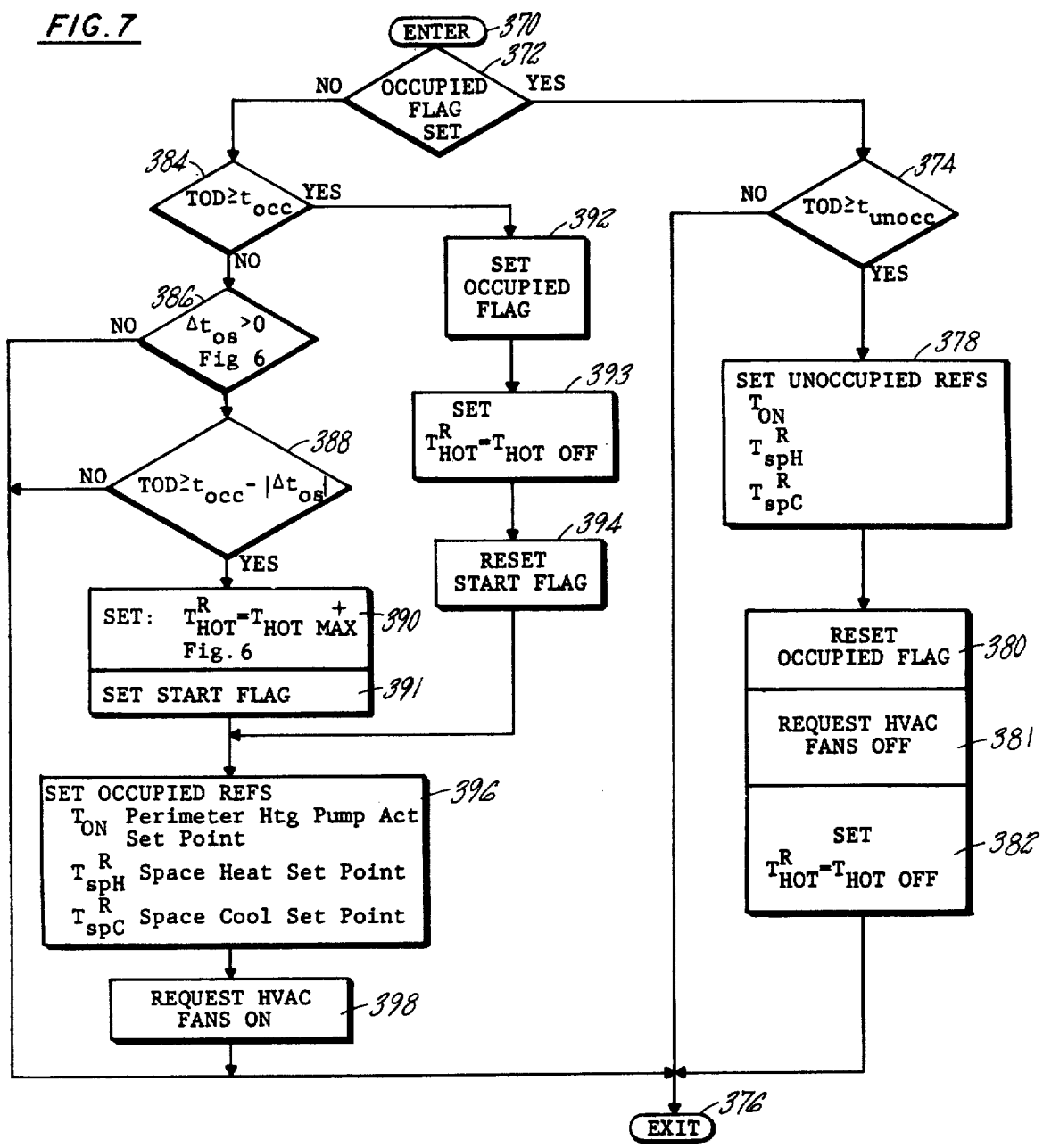
FIG. 7 is a logic flow chart diagram illustrating the processing steps incorporated in another control function of the system of the present invention.

As illustrated in FIG. 5, the flow chart of FIG. 6 is executed at the maximum interval period P$_1$, typically every sixty minutes, and only within the time period defined by instructions 324, 325 of FIG. 6. The value of the optimum start-up time provided by the flow chart of FIG. 6 is used in the flow chart of FIG. 7 to determine the TOD at which the optimum start-up must be initiated to ensure the space temperatures are at the occupied reference values at the beginning of the occupancy period. Referring now to FIG. 7, the CPU enters the flow chart at 370 and instructions 372 request a determination of whether or not the OCCUPIED FLAG is set. As described in detail hereinafter, this flag is set by this flow chart during the occupied periods of operation as determined from occupancy schedules stored within the RAM 272 of the CPU. If the OCCUPIED FLAG is set instructions 374 next request a determination of whether the present TOD is greater than, or equal to, the unoccupied time ($t_{unocc}$). This is the time at which the unoccupied period begins for the present day on which the flow chart is being executed, and is obtained from the occupancy schedule information stored in the CPU RAM. If the present TOD is not greater than $t_{unocc}$ the CPU exits the program at 376, but if the present TOD is greater (the occupied time period has expired in the P$_3$ time interval since the last execution of the flow chart) the CPU next executes instructions 378 which request that all HVAC and PH system temperature references be set-back to determined unoccupied reference values. These temperature references include, but are not limited to: ($T_{ON}$) which is the actuating temperature set point for the perimeter hot water pump (113 FIG. 1), ($T_{spH}^R$) the space heat set point temperature reference, and ($T_{spC}^R$) the space cool set point temperature reference. Following instructions 378, the CPU next executes in sequency: instructions 380 which request a reset of the OCCUPIED FLAG indicating the beginning of the unoccupied period, instructions 381 which request a turn-off of the HVAC fans (both supply fan 34 and return air fan 37 of FIG. 1), and instructions 382 which request a setting of the hot source (108 of FIG. 1) discharge temperature ($T_{HOT}{}^R$) to an off value ($T_{HOT\ OFF}$). Following these instructions, the CPU exits the program at 376. It is assumed in instructions 381, 382 that there is no requirement for leaving the systems on for the unoccupied period. There may be certain installations which require the systems remain on, i.e. laboratory spaces, in which case these instructions would be eliminated.

If instructions 372 determined that the OCCUPIED FLAG is not set, the CPU executes instructions 384 which request a determination of whether the present TOD is greater than or equal to the occupied time $t_{occ}$, i.e. the time at which the occupied period begins. If not, instructions 386 next request a determination of whether the value of $\Delta t_{os}$ is greater than zero thereby indicating that there is a requirement for mechanical heating during the start-up procedure. It should be noted in FIG. 6 that an actual space temperature within the space heat and cool set point temperature limits results in a $\Delta t_{os}$ value equal to zero (instructions 330), and a space temperature greater than the cool set point reference (the space is too warm) results in a negative value of $\Delta t_{os}$ (instructions 334). If the answer to instructions 386 is NO there is no requirement for preheating the spaces and no optimum start-up required, therefore, the CPU exits the flow chart at 376. If the answwer is YES, instructions 388 next request a determination of whether the present TOD is greater than or equal to the occupied time ($t_{occ}$) minus the absolute value of $\Delta t_{os}$, which is that time preceding the beginning of the occupied period at which start-up must be initiated in order to ensure the occupied ambient temperature requirements of the spaces. If the present TOD is within this determined start-up time instructions 390 request a setting of the hot source discharge temperature to a start-up maximum value $T_{HOT\ MAX+}$, typically 205° F. which is higher than the nominal maximum discharge temperature permitted in normal operation of the hot source, and which is permitted only during the optimum start-up period. The setting of the hot source discharge temperature to this start-up maximum value results in the maximum heat output from the PH system which as described hereinafter, provides accelerated heating of the perimeter living spaces (those spaces having the perimeter heaters 110, 111 of FIG. 1 installed) in combination with the mechanical heating provided by the HVAC system. This combined use of a start-up maximum discharge temperature from the perimeter heating system and the mechanical heating from the HVAC system allows for the shortest possible start-up period, and consequently the longest set-back period. Following instructions 390, instructions 391 next request a setting of the START FLAG which provides an indication to the flow charts of FIGS. 6, 9 and 13 that the optimum start-up is in progress.

If in instructions 384 it is determined that the present TOD is greater than $t_{occ}$ instructions 392 request the setting of the OCCUPIED FLAG to indicate space occupancy status to the remaining flow charts. Instructions 393 set the perimeter heat source discharge temperature to an off value ($T_{HOT\ OFF}$) and instructions 394 request a reset of the START FLAG. The perimeter hot source output is set to an off value in instructions 393 to allow the heat source discharge temperature to be controlled to an output value determined by the flow chart of FIG. 8, which provides the normal control of the perimeter heating system. The flow chart of FIG. 7 provides only the optimum start-up control of the perimeter heating system (instructions 390) which is outside the normal PH system control mode. Following instructions 391, or 394, the CPU executes instructions 396 which request a setting of the temperature reference values described hereinbefore with respect to instructions 378, to their occupied values. After instructions 396, the CPU next executes instructions 398 requesting a turn-on of the HVAC fans, and exits the flow chart at 376.

Figure 8:
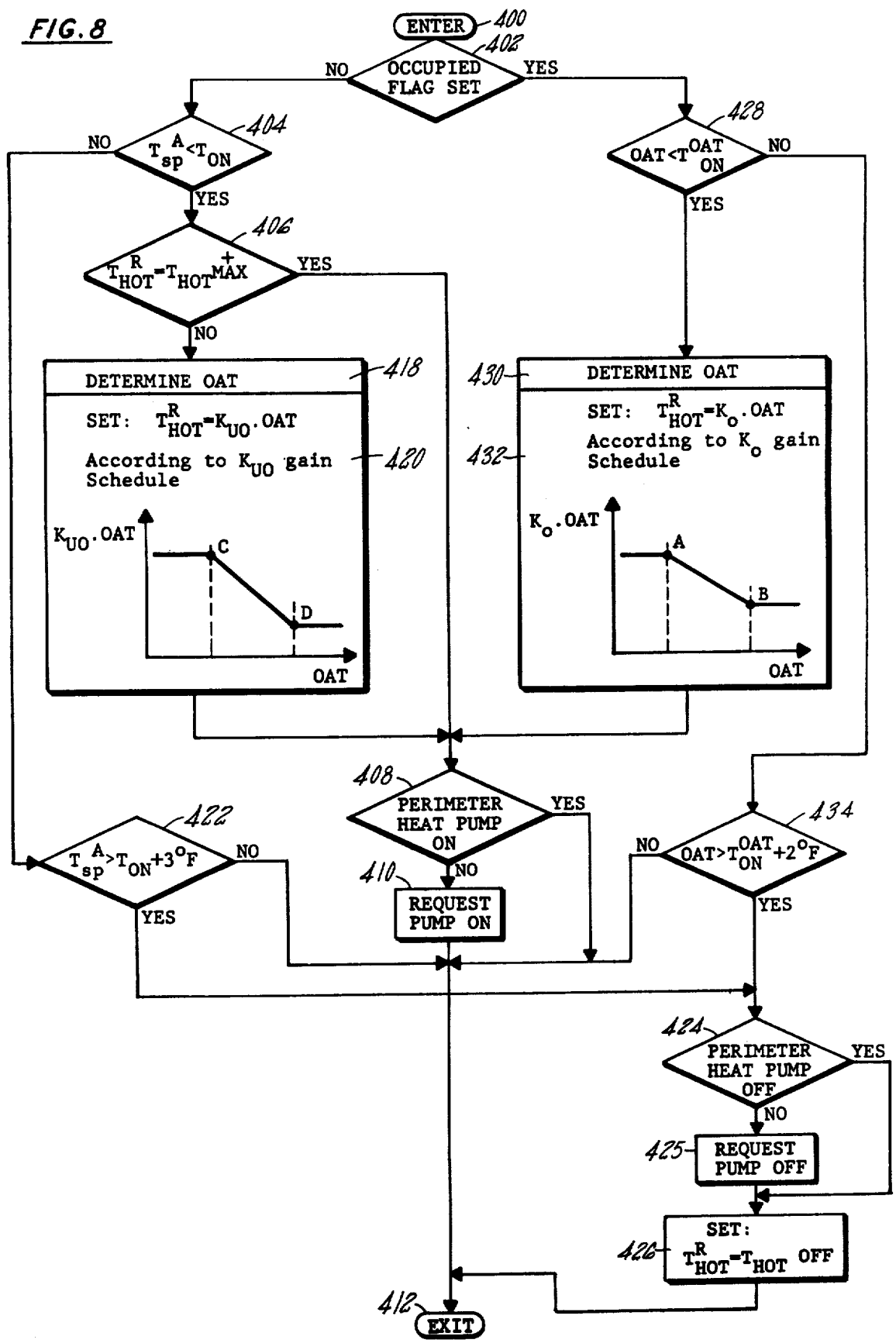
FIG. 8 is a logic flow chart diagram illustrating the processing steps incorporated in still a further control function of the system of the present invention.

Following the execution of the flow chart of FIG. 7, the priority scheduling of FIG. 5 causes the CPU to next execute the flow chart of FIG. 8, which provides normal control over the operation of the PH system. The system is controlled as a function of the OAT in dependence on the occupied/unoccupied status of the living spaces. Referring now to FIG. 8, in a flow chart illustrative of the CPU control over the perimeter heating system, the CPU enters the flow chart at 400 and instructions 402 determine if the OCCUPIED FLAG is set. If not, instructions 404 request the CPU to determine if the actual space temperature (generally the same living space monitored in the flow chart of FIG. 6) is less than the temperature reference $T_{ON}$, which is the temperature set point for actuation of the perimeter heating system pump (113 of FIG. 1). If the space temperature is less instructions 406 next request the CPU determination of whether the discharge temperature from the PH system hot source is set at the start-up maximum value $T_{HOT\ MAX+}$ (set by instructions 384 of FIG. 7) indicating a present optimum start-up procedure. If YES, the CPU next executes instructions 408 to determine if the perimeter heat pump is on, and, if not on, instructions 410 request the pump turn-on, after which the CPU exits the flow chart at 412.

If the answer to instructions 406 is NO, i.e. no present start-up procedure, instructions 418 request the present value of OAT and instructions 420 request the CPU setting of the source reference discharge temperature $T_{HOT}{}^R = K_{UO} \cdot OAT$. The gain $K_{UO}$(°F./°F.) is selected in dependence on the known thermal characteristics of the building and in response to the desired unoccupied, or set-back ambient temperature conditions in the spaces. The gain schedule for $K_{UO}$ is illustrated qualitatively against OAT in the box of instructions 420. As shown, the $K_{UO}$ gain transitions from a maximum value at the lower OAT temperatures, thereby requesting a higher discharge temperature from the heat source, to a minimum value at the higher OAT values where the perimeter heating system output load is less. Following instructions 420, the CPU executes instructions 408, 410, and exits the flow chart at 412.

If instructions 404 determine that the actual sensed space temperature is not less than $T_{ON}$ instructions 422 direct the CPU to determine if the actual space temperature is greater than $T_{ON}$ by 3° F. If not, the CPU exits the program at 412. If it is, the CPU executes instructions 424 to determine if the perimeter heat pump is off and, if not off, instructions 425 request the pump off. Instructions 426 next request the CPU to set the discharge temperature reference $T_{HOT}{}^R = T_{HOT\ OFF}$ since a space temperature 3° F. higher than the actuating set point reference indicates the lack of a present requirement for perimeter heating.

If instructions 402 determine that the OCCUPIED FLAG is set, the CPU actuates the perimeter heating system as a function of the OAT rather than the actual space temperature as in instructions 404 for the unoccupied period since for the unoccupied period the perimeter heating system is the primary source of heating to prevent freeze-up of the spaces, but for the occupied period the perimeter heating system acts as a supplemental heating source to the HVAC system in those perimeter spaces. Therefore, instructions 428 request a CPU determination of whether the present OAT is less than the reference ($T_{ON}{}^{OAT}$), which is the pump actuating temperature set point referred to OAT. If YES, instructions 430 request a determination of the present OAT and instructions 432 request a setting of the hot source reference discharge temperature $T_{HOT}{}^R = K_O \cdot OAT$. The gain constant $K_O$ is selected in dependence on the building thermal characteristics, but in response to the desired occupied space ambient temperature conditions, and is set according to the gain schedule illustrated in the instructions block of 432. The $K_O$ gain constant transitions from a max to a min value as a function of OAT in a similar manner to the $K_{UO}$ value of instructions 420, however, the magnitude of the $K_O$ value differs from that of the unoccupied value since the perimeter heating system output requirement differs with actuation of the HVAC system. Again the $K_O$ value is illustrated qualitatively as including a three segment gain schedule. Following instructions 432 the CPU again executes instructions 408, 410 and exits the flow chart at 412.

If instructions 428 determine that the OAT is not less than the pump actuating reference, the CPU executes instructions 434 to determine if the OAT is greater than the actuating pump reference by 2° F. If not, then the CPU exits the program, however if the present OAT is greater by 2° F., then the indication is that there is no present need for the perimeter heating system output and the CPU again executes instructions 424–426 to shut off the perimeter heating system, and exits the program at 412.

During the unoccupied period any requirement for cooling of the spaces is first attempted through the use of nighttime outside air rather than HVAC mechanical cooling. This function is provided by the CPU through execution of the flow charts of FIGS. 9, 12. Following the execution of the FIG. 8 flow chart, the CPU enters the flow chart of FIG. 9 at 440, and instructions 442 request a determination of whether the space mixed damper reference, (Y%) factor is greater or equal to 50%. The Y% value is selected by the maintenance operator in establishing the mixed air damper space temperature reference ($T_{spD}{}^R = T_{spH}{}^R + Y\%[T_{spC}{}^R - T_{spH}{}^R]$) which is used in the mixed air temperature regulation of the flow chart of FIG. 12 and which is described in the hereinbefore referenced application to Games et al. As disclosed by Games the Y% factor has a typical range of from 20% during the cooling season to 80% during the heating season. The instructions 442, by requesting the Y% value to be greater than or equal to 50%, thereby prevent the use of cold outside air during the heating season i.e. wintertime. Similarly by allowing programmed changes in the Y% value, the control system allows the operator to inhibit the use of outside air at any time, thereby allowing flexibility in control. Following instructions 442 the CPU next executes instructions 443, 444 to determine if the present TOD is within a specified time period prior to occupancy within which the use of nighttime air is permitted for cooling. If the present TOD is outside the time period no outside air cooling is permitted. If the present TOD exceeds the maximum time (0800) in the period, instructions 446 request a reset of the PRECOOL FLAG to inhibit further use of outside air for cooling since the occupancy period is about to begin. Following instructions 446 the CPU exits the program at 448.

If the present TOD is within the specified precool time period, instructions 450 determine if the PRECOOL FLAG is presently set. If the answer is NO, instructions 452 request a determination of whether the actual sensed space temperature (generally the same selected living space used in FIGS. 6, 8, although it may be another space found to have a higher cooling load, i.e. a hotter space) is 2° F. greater than the selected (Y%) space mixed air temperature reference value ($T_{spD}{}^R$). If the answer is YES, instructions 454 determine if the temperature difference between the actual space temperature and the present OAT is greater than or equal to 8° F., and if so, instructions 456 request a determination of whether the outside air enthalpy ($h_o$) is less than 30 BTU/lb. Following a YES answer to each of the instructions 452, 454, and 456, the CPU has determined that the present space temperature, and the outside air temperature and enthalpy conditions are satisfactory for allowing the use of outside air to precool the spaces. The CPU then executes instructions 458 to turn-on of the HVAC fans, and instructions 460 to set the PRECOOL FLAG, after which the CPU exits the flow chart. A NO answer to any of the instructions 452, 454, 456, cause the CPU to exit the flow chart without a fan turn-on.

If instructions 450 determined that the PRECOOL FLAG is set, instructions 462 determine if the START or OCCUPIED FLAGS are set, since the outside air cooling provided by this flow chart is undesirable during the occupied or optimum start-up periods. If the answer is YES, the CPU exits the program at 448. If the answer is NO, the instructions 464 next determine if the actual space temperature is 1° F. greater than the space mixed air reference. If YES, the CPU exits the program since the space temperature is high enough to require continued precooling. If NO, the CPU executes instructions 466 to request a turn-off of the HVAC fans, followed by instructions 468 requesting a reset of the PRECOOL FLAG, indicating that outside air cooling is no longer required. Following instructions 468 the CPU exits the flow chart at 448.

Figure 10:
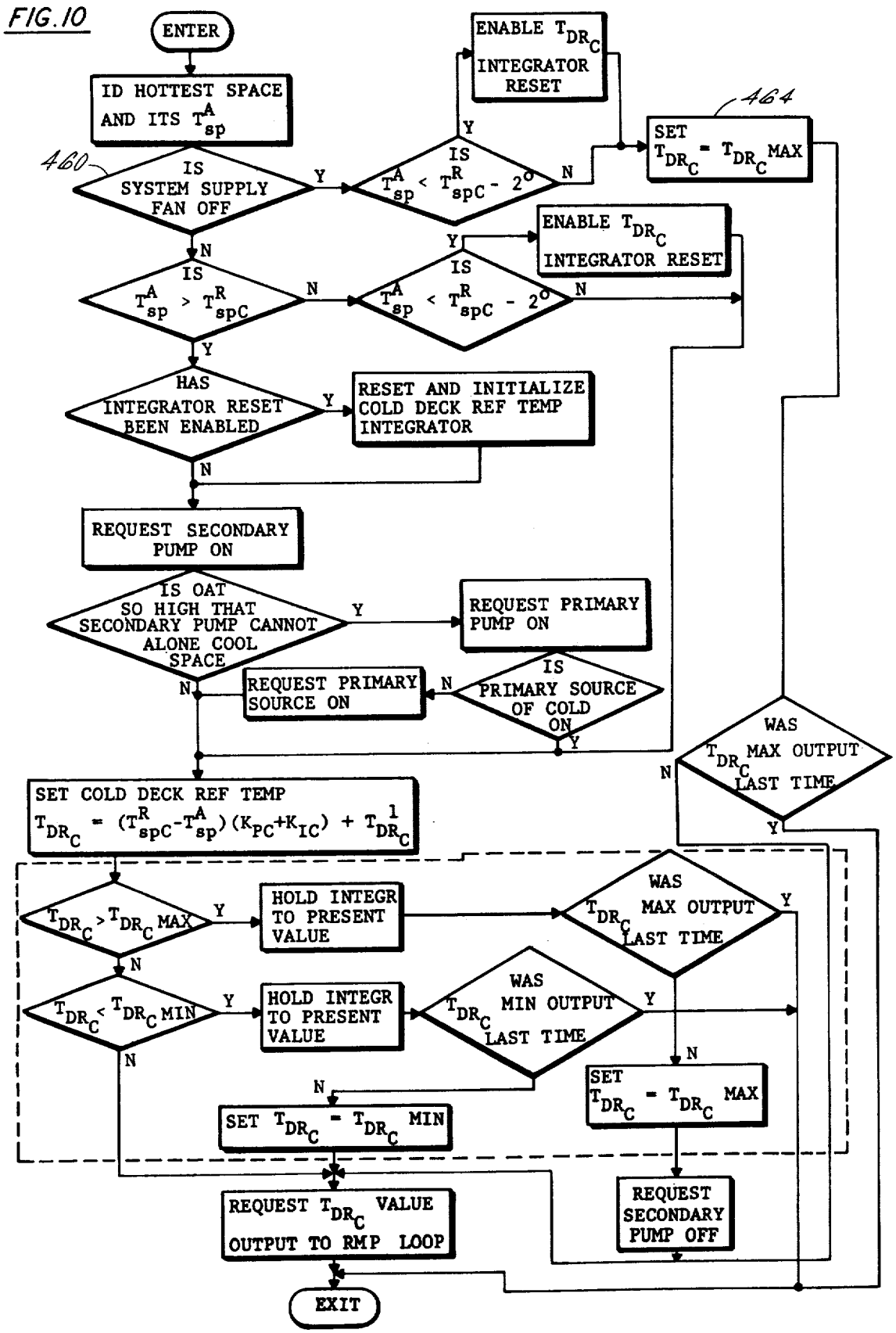
FIG. 10 is a logic flow chart diagram illustration of the processing steps provided by a control function disclosed and claimed in the copending application to Games et al, and is included herein to illustrate the interrelationship thereof with the control system of the present invention.
Figure 11:
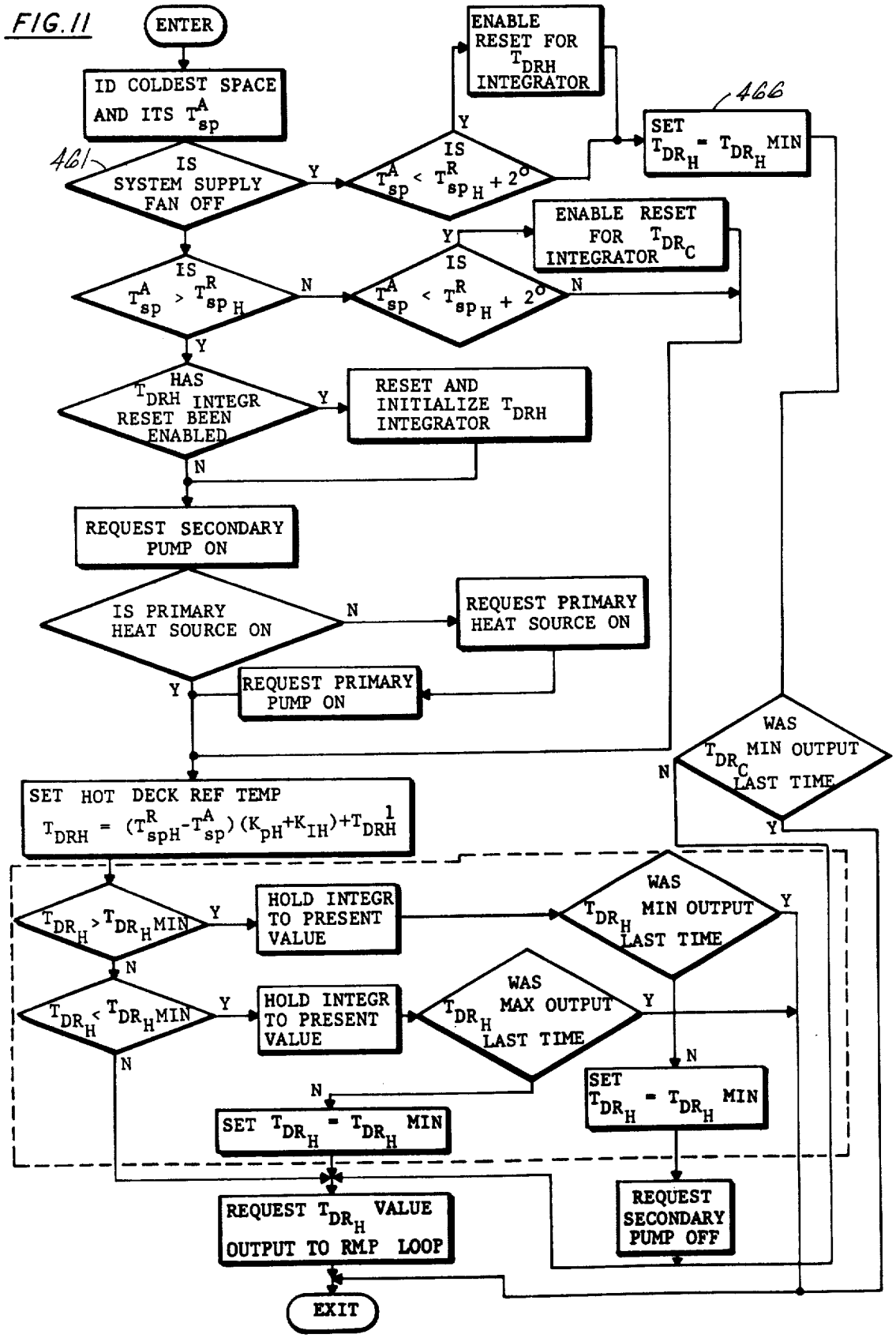
FIG. 11 is another logic flow chart diagram illustrating the processing steps of a function disclosed and claimed in the copending application to Games et al, included herein to illustrate the interrelationship thereof with the system of the present invention.
Figure 12:
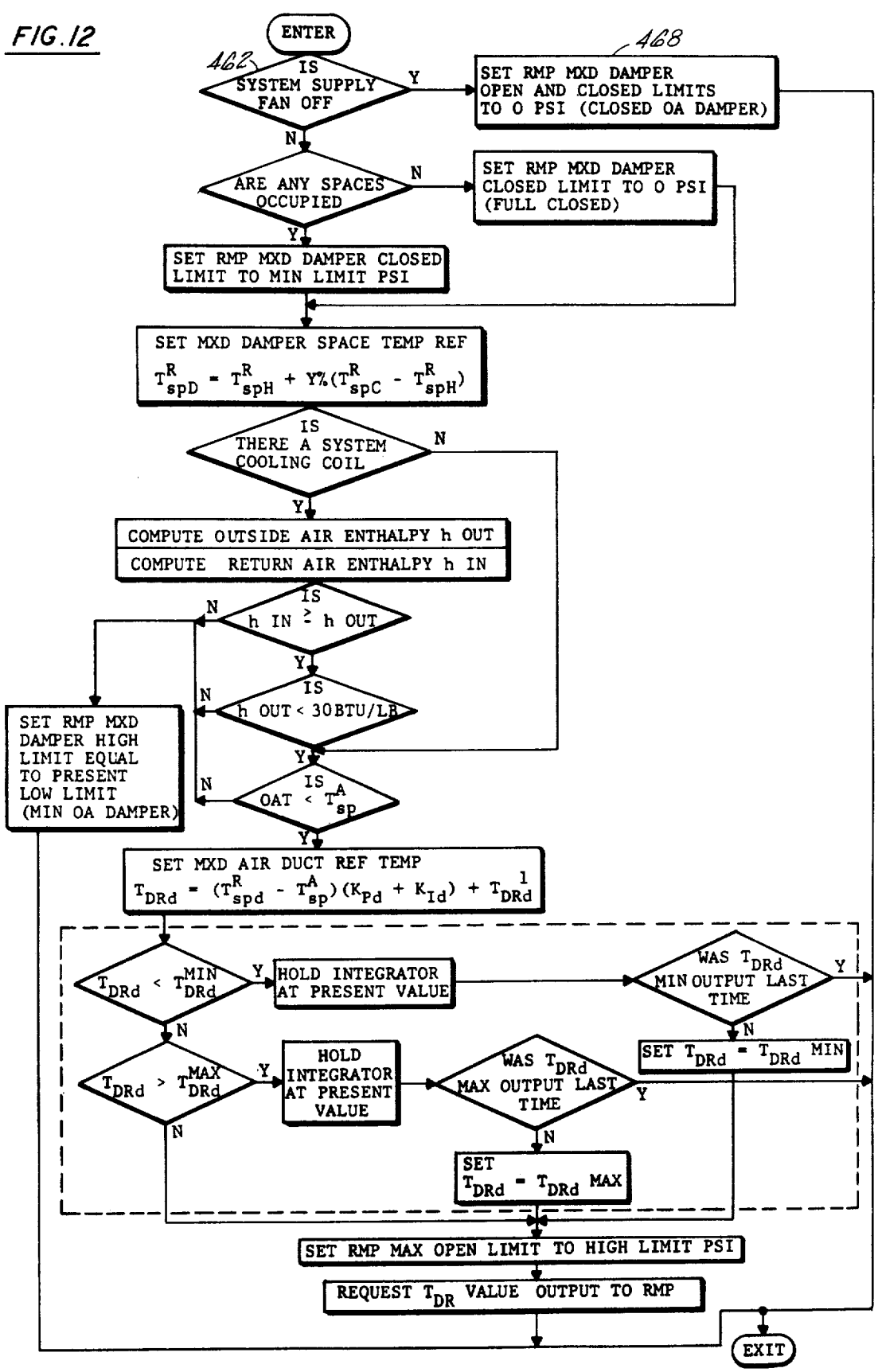
FIG. 12 is still another logic flow diagram illustrating the processing steps of a function disclosed and claimed in the copending application to Games et al, and included herein to illustrate the interrelationship thereof with the system of the present invention.

The flow charts of FIGS. 10, 11, and 12 illustrate the central control of the HVAC system in providing mechanical cooling, mechanical heating, and mixed air regulation respectively. As stated hereinbefore, these functions are described in detail, and claimed in the hereinbefore referenced application to Games et al, and are described briefly herein to the extent necessary to show the interrelationship of the control system of the present application and that claimed in the application to Games et al. As shown in FIG. 5, these flow charts are executed at the shortest interval period (P4) which typically is 5 minutes. These flow charts control the CPU operation in providing the calculated reference temperature values which are then transmitted to the RMP to provide the actual, innerloop control over the HVAC and PH operation. FIG. 10 controls the cold air discharge temperature ($T_{DC}{}^4$) from the cold deck (33 of FIG. 1), and in an identical manner, the flow chart of FIG. 11 controls the hot air discharge temperature ($T_{DH}{}^4$) from the hot deck (32 of FIG. 1). Each of these flow charts direct the CPU in providing a cold deck reference temperature ($T_{DRC}$) and a hot deck reference temperature ($T_{DRH}$) in response to the deviation of the coldest and hottest actual space temperatures ($T_{sp}{}^A$) from the corresponding space cool ($T_{spC}{}^R$) and heat ($T_{spH}{}^R$) set point reference values. These space set point reference temperatures have different values for the occupied and unoccupied periods, and are set to the desired one of the values by the instructions 378, or 394 of FIG. 7. Similarly, the control over the mixed air regulation as illustrated by the flow chart in FIG. 12, controls the space temperatures to the mixed damper space temperature reference ($T_{spD}{}^R$) determined by the setting of the Y% factor and as a function of the space heat and cool set point reference values, such that the mixed damper temperature reference value is set indirectly to an occupied or unoccupied value through the setting of the heat and cool set point values. In FIGS. 10-12, the CPU execution of the flow chart is dependent on the status of the system supply fan (34 of FIG. 1) such that the CPU executes the flow chart only if the supply fan is energized, and if de-energized the CPU exits the flow chart after execution of the described reset functions, but without execution of the flow chart. This determination of supply fan status is provided in flow charts 10-12 by the respective instructions 460-462, each requesting a determination of whether or not the system supply fan is off. If the system supply fan is off, the flow charts of FIGS. 10, 11 request a setting of the cold and hot deck references to maximum and minimum values respectively (instructions 464, 466 of FIGS. 10, 11) after which the CPU exits the flow chart. Similarly, in FIG. 12 following a determination that the system supply fan is off, the mixed air dampers (41$_a$, 41$_b$ of FIG. 1) are set to the fully closed position in instructions 468, after which the CPU exits the flow chart. Therefore, CPU control over the HVAC supply fan in instructions 382, 396 of FIG. 7 together with the setting of the space heat and cool set point reference values to either occupied or unoccupied values in instructions 378, 394 of FIG. 7, provides control over actuation and operation of the flow charts of FIGS. 10-12.

Figure 13:
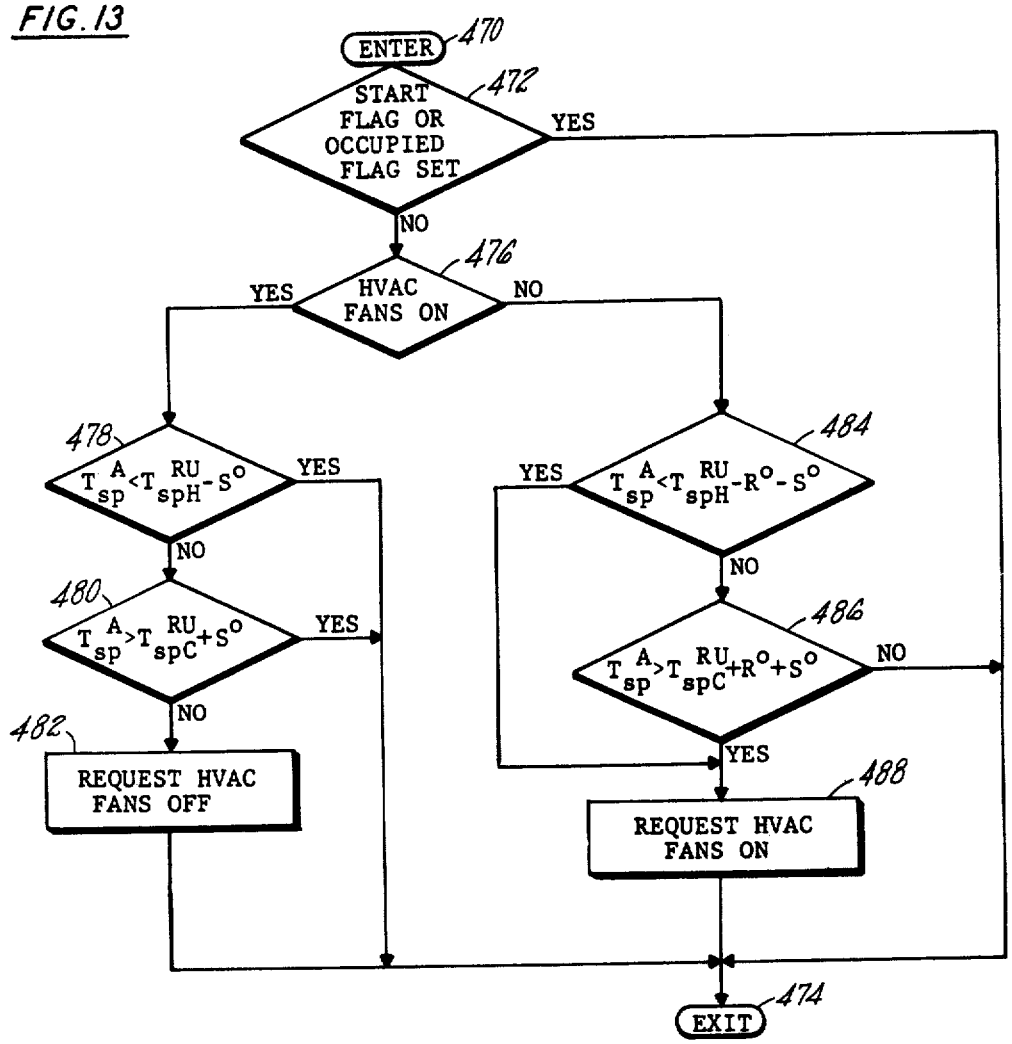
FIG. 13 is a logic flow chart diagram illustrating the processing steps incorporated in still another control function of the system of the present invention.

The final flow chart in the priority list of FIG. 5 is FIG. 13 which controls the actuation of the HVAC fans during those periods of time in which the spaces are neither occupied, nor under an optimum start-up procedure. The flow chart of FIG. 13 provides a turn on of the HVAC system only to prevent freeze-up or overheating of the spaces when the peripheral heating system, or free nighttime air cooling prove insufficient. Referring now to FIG. 13 in a flow chart illustrative of CPU control over the HVAC system during unoccupied periods, the CPU enters the flow chart at 470 and instructions 472 determine whether or not the START or OCCUPIED FLAGS are set. If either is set, the CPU exits the program at 474. If neither flag is set, instructions 476 request a determination of whether the HVAC fans are presently on. If the fans are on, instructions 478, 480 determine if the actual space temperature is below the unoccupied space cool set point temperature reference, by a selected S° F. temperature increment. The S° F. value is selected by the operator and permits actuation of the HVAC fans at the specified temperature increment above or below the respective unoccupied set point value, after which the flow charts of FIGS. 10 or 11 request the CPU and RMP to provide the actual control of the HVAC output to the unoccupied heat and cool set points. If the fans were actuated at the set point values themselves, they would be continually switched on or off as FIGS. 10, 11 controlled the space to the set point reference. If the answer to either instructions is YES, the CPU exits the flow chart at 474. If the answer to both instruction is NO, such that the actual space temperature is within S° F. of the set point references, instructions 482 request that the fans be turned off, after which the CPU exits the program. Therefore, if the fans are on, instructions 478, 480 determine whether or not the fans may be turned off.

If the answer to instructions 476 is NO, the flow chart of FIG. 13 determines if the fans should be turned on to prevent the freeze-up or overheat conditions. In order that the HVAC fans be turned on the actual space temperature must be below the unoccupied heat set point or above the unoccupied cool set point by a temperature increment equal to the sum R° F.+S° F. The R° F. value is selected to provide a deadband around the S° F. band, to prevent a recurring turn-on/turn-off of the fans, i.e. a dithering of fan actuation. The actual value of R° F. is selectable by the operator. Therefore, instructions 484, 486 are executed following a NO answer to instructions 476, each comparing respectively the space temperature to the heat and cool set point values in a similar manner to instructions 478, 480, but with the added R° F. temperature deadband value. If the actual space temperature exceeds either set point value by R° F.+S° F. instructions 488 request a turn-on of the HVAC fan after which the CPU exits the flow chart. If the actual space temperature is within the R° F.+S° F. limits of both set points, the CPU exits the flow chart without requesting a turn-on of the fans.

In operation, the control of the present invention, executes the flow charts of FIGS. 6-13 periodically, in the order shown in FIG. 5. Assuming that the present TOD exceeds the unoccupied time ($t_{unocc}$) as determined by instructions 374 of FIG. 7, such that instructions 378, 380, 382, and 384 of FIG. 7: set the unoccupied reference values, reset the OCCUPIED FLAG, request the turn-off of the HVAC fans, and set the perimeter heating system discharge temperature $T_{HOT}{}^R = T_{HOT\ OFF}$. This is followed by the flow chart of FIG. 8 where the CPU executes the unoccupied routine (instructions 402 determine that the OCCUPIED FLAG is not set). Since $T_{ON}$ is equal to the unoccupied value (set by instructions 378 in the immediately preceding execution of the flow chart of FIG. 7) the actual space temperature should be more than 3° F. above the $T_{ON}$ value, resulting in a turn-off of the perimeter heat pump and heat source in instructions 424-426 of FIG. 8.

Figure 9:
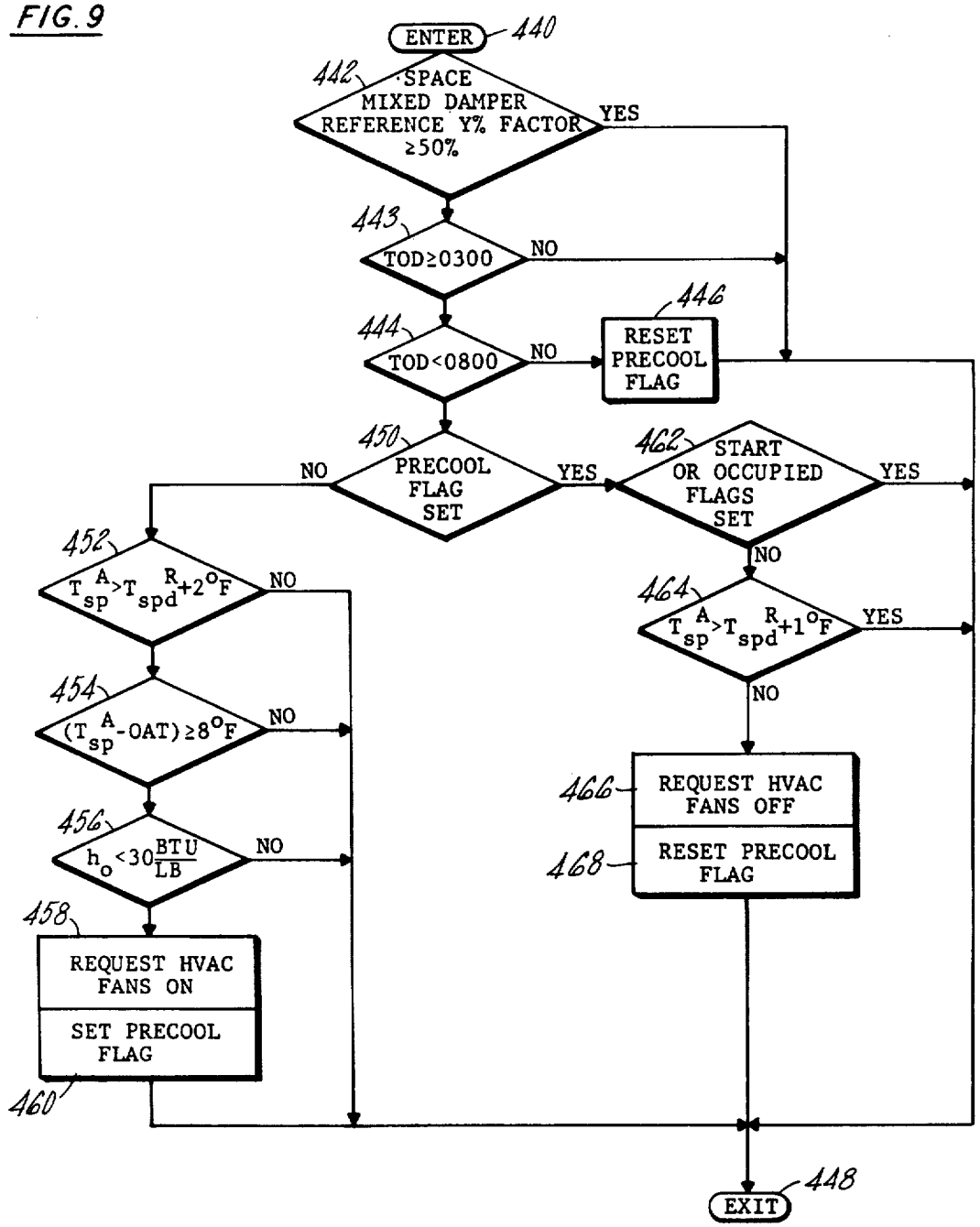
FIG. 9 is a flow chart diagram illustrating the processing steps incorporated in still a further control function of the system of the present invention.

The CPU next enters the outside air cooling flow chart of FIG. 9. Since it is assumed that the unoccupied time is prior to the period established in instructions 443, 444, the CPU exits the flow chart without further execution. Similarly, the flow charts of FIGS. 10-12 are exited after setting the cold and hot deck discharge temperature references to their respective maximum and minimum values, and after setting the mixed air dampers to the full closed position, since the system supply fan is off as requested by instructions 382 of FIG. 7. Finally, the CPU enters the flow chart of FIG. 13, and after determining that neither the START FLAG nor OCCUPIED FLAG is set (instructions 472) and the HVAC fans are not on (instructions 476) the actual space temperature is compared to the set-back, space heat and cool reference values as modified by the S° F. and R° F. temperature bands. Since the unoccupied period has just begun it may be assumed that the actual space temperature does not deviate from the unoccupied set point values by more than the S° and R° F. temperature increment values, such that the CPU exits the flow chart without requesting a turn-on of the HVAC fans.

The CPU continues to periodically execute the flow charts in accordance with the interval time schedule illustrated in FIG. 5. Assuming that the initial execution of the flow charts for the unoccupied period occurred at 0 minutes in FIG. 5, the status of the perimeter heating system and the HVAC system cannot be altered until the next execution of FIG. 7, 8 or 13. Throughout the unoccupied period the flow chart of FIG. 8 monitors the actual space temperature and compares it to the pump actuating temperature reference ($T_{ON}$), and as long as the actual space temperature is less the perimeter heating system is not actuated. Similarly, the flow chart of FIG. 13 compares the space temperature to the unoccupied space set point references ± the S° and R° F. tolerances. To ensure that the perimeter heat system is turned on first in the event of a potential freeze-up, the reference $T_{ON}$ provides a higher heat threshold value than that provided by the quantity $T_{spH}{}^{RU}$-R°-S° F. In the event that the space temperature falls below the $T_{ON}$ reference of FIG. 8, the perimeter heat pump is turned on and the discharge temperature set according to the unoccupied schedule of instructions 420 (FIG. 8). If the space temperature continues to decrease due to decreasing OAT, the discharge temperature from the heat source is adjusted according to the $K_{UO}$ gain schedule of instructions 420. If, however, the temperature in the space drops due to localized effects other than OAT changes, such that the space temperature falls below the reference established by instructions 484 of FIG. 13, or if the perimeter heating alone is insufficient to maintain the spaces above the unoccupied heat set point value, then the HVAC fans are requested on through instructions 488 of FIG. 13 enabling the HVAC mechanical heating flow chart of FIG. 11. With either the perimeter heating system, or HVAC system turned on, the CPU continues to survey the actual sensed temperature in the spaces throughout the unoccupied period to determine if the systems may be shut-off, thereby minimizing the total on time of either system during the unoccupied period.

As the unoccupied period approaches the early morning hours and the TOD becomes greater than or equal to the initial time established for the precooling period in instructions 443 of FIG. 9, the CPU executes the flow chart of FIG. 9 to determine if it is permissible to cool the spaces with outside air. If instructions 452, 454 determine that the actual space temperature is less than 2° F. above $T_{spD}{}^R$, and instructions 454, 456 determine that the OAT and outside enthalpy conditions are satisfactory, instructions 458 request a turn-on of the HVAC fans. This activates the flow charts of FIGS. 10-12, however, assuming that the space temperatures are within the limits of the unoccupied values of the heat and cool set points of FIGS. 10, 11, only the flow chart of FIG. 12 controlling mixed air regulation will be executed by the CPU. This results in the use of the nighttime outside air to provide cooling of the spaces. At subsequent $P_3$ intervals (typically 15 minutes) the CPU re-executes the flow chart of FIG. 9 and as long as the spaces are neither occupied nor started (instructions 462), and the actual sensed temperature is greater than the mixed air space reference by the 1° F. tolerance, the fans remain on. If in any execution of the flow chart it is determined that the actual space temperature is less than 1° F. above the mixed air reference (instructions 464) instructions 466 turn off the HVAC fans, thereby shutting down the outside air cooling function.

As the occupied time approaches, such that the TOD falls within the interval time period established by instructions 324, 325 of FIG. 6, the start-up time interval $\Delta t_{os}$ is calculated, as described hereinbefore, by the flow chart of FIG. 6. FIG. 7 compares the present TOD with the stored occupied time value ($t_{occ}$) as modified by the absolute value of $\Delta t_{os}$. If it is determined that the TOD is greater than or equal to the time required for start-up, the start-up procedure is initiated by instructions 384, 386, 394 and 396 of FIG. 7. With the initialization of the start-up procedure, including the setting of the space heat and cool set point references to the occupied values and the turn-on of the HVAC fans, the flow charts of FIGS. 10-12 are activated. At the same time the perimeter heating system is driven to the maximum discharge temperature value to accelerate the heat-up of the spaces prior to occupancy. When the present TOD exceeds, or is equal to, the occupied time as determined by instructions 378 of FIG. 7, instructions 388 set the OCCUPIED FLAG providing an indication to the remaining flow charts of the occupied space status. With the OCCUPIED FLAG set, the flow chart of FIG. 7 provides a periodic comparison of the TOD with the unoccupied time, but otherwise provides no control during the occupied period. The flow chart of FIG. 8 now controls the perimeter heating system to a discharge temperature established by the gain $K_O$, the occupied gain schedule, which again provides supplemental heating to that provided by the HVAC system in those perimeter living spaces having the perimeter heaters installed.

The turn-on of the HVAC system and the setting of the reference temperatures to the occupied values, results in the control of the HVAC according to the flow charts of FIGS. 10-12 as described in the hereinbefore referenced application to Games et al. The flow chart of FIG. 13 is inhibited throughout the occupied period by instructions 472, i.e. if the OCCUPIED FLAG is set the CPU exits the flow chart without execution.

The actual control over the hot fluid discharge temperature of the hot source (108, FIG. 1) is provided through a proportional gain loop in the RMP. The RMP loop is not illustrated in the present application, but is illustrated in each of the hereinbefore referenced, copending applications (FIG. 10 in each copending application) and the detailed description included therein with respect to the proportional gain loop is expressly incorporated by reference in the present application. Similarly, the hot fluid reference discharge temperature calculated by the CPU for the perimeter heating system hot source in the present applicaton, is provided in an identical manner to that disclosed in the hereinbefore referenced, copending application to Healey et al, with respect to the calculation of a chill water reference temperature (illustrated by Healey in the flow chart of FIG. 9 in the Healey application, and described therein as being applicable also to the calculation of the hot source discharge temperature reference signal) all of which is expressly incorporated by reference in the present application.

In the control of the present invention, the calculation of an optimum start-up time in the flow chart of FIG. 6, in combination with the simultaneous actuation of the HVAC and perimeter heating system in the flow chart of FIG. 7 establish an optimum start-up procedure which provides a reduction in the start-up time of the prior art systems, such as that described in the hereinbefore referenced patent to Davis et al, by a factor of one-half. The shortened start-up time interval results in an extended period of control of the space ambient temperature to the unoccupied space heat and cool reference values, thereby providing extended energy conservation in the operation of both the HVAC and perimeter heating systems due to the reduced temperature gradient between the space ambient and outside air temperatures. In addition, the shutoff of the HVAC air handler fan except as necessary to supplement the heating provided by the perimeter heating system, provides a significant reduction in the electrical energy consumption of the air handler during the unoccupied periods. The variable constants associated with the optimum start-time equation (instructions 342 and 346, FIG. 6) are readily reprogrammed through operator entry through the keyboard 262, of the CPU 250 (FIG. 3) to accommodate changes in the thermal response characteristics of the spaces. In the same manner, the reference temperature values for the space head and cool reference temperature signals, in addition to the actuating reference temperatures for the perimeter heat pump, are changeable through keyboard entry by the operator.

Similarly, although the invention has been shown and described with respect to a detailed embodiment thereof, it should be understood by those skilled in the art that the foregoing and various other changes, omissions and additions in the form and detail thereof may be made therein and thereto without departing from the spirit and the scope of the invention.

Having thus described detail embodiments of our invention, that which we claim is new and desired to secure by letters patent is:

1. Apparatus for controlling, in combination during unoccupied periods, the operation of an HVAC and perimeter heating system providing temperature regulation in a living space having occupied and unoccupied periods, the HVAC output including hot air from an air handler heating apparatus which modulates the discharge temperature in dependence on a space temperature error signal presented thereto at a magnitude equal to the temperature difference between an actual space temperature signal and a space heat reference temperature signal, the air handler including a fan for forcing the hot air into the space, the perimeter heating system providing hot fluid from a hot source at a determined discharge temperature, the hot fluid being presented to heaters in the space by a pump, the fan and pump each energized through connection to a voltage source, the apparatus comprising:

temperature sensor means, for providing sensed temperature signals including, an actual hot air discharge temperature signal, an actual hot fluid discharge temperature signal, and an actual space temperature signal;

electronic processing means, providing an actual time of day signal, and having means for storing signals including real time signals establishing a plurality of real time intervals, each interval representative of an associated one of the space occupied and unoccupied periods, said processing means comparing said actual time of day signal with said real time intervals for providing an unoccupied signal manifestation in response to said actual time of day signal indicating a present unoccupied period, said means for storing signals further including a perimeter heat actuating temperature signal, said processing means being responsive to said sensed temperature signals for comparing said actual space temperature signal with said perimeter heat actuating temperature signal for providing, in the presence of said unoccupied signal manifestation, a perimeter heat pump off gate signal in response to said actual space temperature signal indication of a space temperature higher than said perimeter heat actuating temperature signal; and pump switch means, interconnected between the voltage source and the pump, and responsive to said pump off gate signal presented at a gate input thereof, said switch means providing a connection of the pump to the voltage source in the absence of said pump off gate signal, said switch means not providing the connection in the presence of said pump off gate signal.

2. The apparatus of claim 1, wherein said means for storing signals further includes an occupied space heat reference temperature signal and an unoccupied space heat reference temperature signal representative of a lower temperature value than that of said occupied space heat reference temperature signal, said processing means, in the presence of said unoccupied signal manifestation, comparing said actual space temperature signal to said unoccupied space heat reference temperature signal to provide an unoccupied space heat temperature error signal at a magnitude in dependence on the temperature difference therebetween, said processing means providing, in response to said unoccupied space temperature error signal, a hot air reference discharge temperature signal at a magnitude in dependence on said temperature difference, said processing means presenting said reference discharge signal to the HVAC heating apparatus to provide modulation of the hot air discharge temperature in dependence on the magnitude thereof.

3. The apparatus of claim 2, further comprising:

fan switch means, interconnected between the voltage source and the fan, and responsive to a fan off gate signal presented at a gate input thereof, said fan switch means providing connection of the fan to the voltage source in the absence of said fan off gate signal, said switch means not providing said connection in the presence of said fan off gate signal; and wherein said processing means provides said fan off gate signal in the presence of said unoccupied signal manifestation in the absence of said unoccupied space heat temperature error signal.

4. The apparatus of claim 3 wherein said perimeter heat actuating temperature signal included in said means for storing signals is representative of a higher temperature value than that of said unoccupied space heat reference temperature signal.

5. The apparatus of claim 3, wherein said means for storing signals further includes real time signals representative of a start-up time interval within each unoccupied period, said start time interval being bounded by a minimum time signal and a maximum time signal, said maximum time signal having a real time value coincident with the end of the unoccupied period, said processing means, in the presence of said unoccupied signal manifestation, comparing said actual time of day signal with said start time interval for providing a start signal manifestation in response to said actual time of day signal indicating a present time therein, said processing means, in response to said start signal manifestation, comparing said actual space temperature signal to said occupied space heat reference temperature signal to provide an occupied space temperature error signal in response to, and at a magnitude equal to, a temperature difference therebetween, said processing means, in the presence of said start signal manifestation, providing said fan off gate signal and said pump off gate signal only in the absence of said occupied space temperature error signal.

6. The apparatus of claim 5, wherein said processing means further provides, simultaneously, in the presence of said start signal manifestation, a hot air reference discharge temperature signal and a hot fluid start-up reference discharge temperature signal, said processing means providing said hot air reference discharge temperature signal at a magnitude in dependence on said occupied space temperature error signal, said processing means presenting said hot air reference discharge temperature signal to the HVAC heating apparatus to provide modulation of the hot air discharge temperature in dependence on the magnitude thereof, said processing means providing said hot fluid start-up reference discharge temperature signal at a magnitude representative of a maximum discharge temperature value greater than that provided in normal operation of the perimeter heating system hot source, said processing means presenting said start-up reference discharge temperature signal to the hot source to provide control of the hot fluid discharge temperature in dependence on the magnitude thereof.

7. The apparatus of claim 6, further comprising:
outside temperature sensor means, for providing an actual outside air temperature signal;
outside wind sensor means, for providing an actual outside air average wind speed signal; and wherein
said processing means is responsive to said actual outside air temperature signal and said actual average wind speed signal for providing, in each start-up time interval, an optimum start-up time signal representative of a real time value which precedes that established by said maximum time signal by an incremental time period having a magnitude equal to the time required to increase said actual space temperature signal magnitude, in the presence of outside temperature and wind conditions as manifested by the magnitudes of said actual outside air temperature signal and said actual outside air average wind speed signal presented thereto, and in the presence further of hot air and hot fluid presented simultaneously thereto from the HVAC and perimeter heating systems, from that temperature value provided in a present unoccupied period through control of the hot air discharge temperature in response to said unoccupied space temperature error signal, to that temperature value provided in an occupied period by control of the hot air discharge temperature in response to said occupied space temperature error signal, said processing means further providing said start signal manifestation in response to said actual time of day signal indicative of a present time equal to that of said optimum start-up time signal.

8. The apparatus of claim 7, wherein:
said processing means further includes means for successively sampling periodically and registering in said means for storing signals, successively sampled values of said actual space temperature signal, said actual outside air temperature signal, and said actual outside air average wind speed signal;
said means for storing signals further includes a wind proportional gain signal; and
said processing means compares successively sampled values of said actual space temperature signal and said actual outside air temperature signal to provide a temperature gradient signal, in each sampling period, in response to a temperature difference therebetween, said processing means providing said optimum start-up time signal at a real time value which precedes said maximum time signal by an incremental time period having a magnitude in dependence on the product of said wind proportional gain signal, and said temperature gradient and said actual outside air average wind speed signals provided in a determined sampling period following said actual time of day signal indication of a time equal to said minimum time signal.

9. The apparatus of claim 8, wherein said processing means provides, in said determined sampling period, a squared magnitude actual outside air average wind speed signal, and said processing means further provides said optimum start-up time signal at a real time value which precedes said maximum time signal by an incremental time period having a magnitude equal to the product of said wind proportional gain signal, and said temperature gradient signal and said squared magnitude wind speed signal provided in said determined sampling period.

10. The apparatus of claim 8, further comprising:
means responsive to operator control for providing parameter signals representative of said real time intervals establishing the space occupied and unoccupied periods, said perimeter heat actuating temperature signal, said occupied space heat reference temperature signal, said unoccupied space heat reference temperature signal, said real time signals representative of said start-up time intervals, and said wind proportional gain signal, in response to selective operation thereof; and wherein
said electronic processing means further includes means for registering said parameter signals in said means for storing signals.

11. The apparatus of claim 2, further comprising:
means responsive to operator control for providing parameter signals representative of said real time intervals establishing the space occupied and unoccupied periods, said perimeter heat actuating temperature signal, said occupied space heat reference temperature signal, and said unoccupied space heat reference temperature signal, in response to selective operation thereof; and wherein
said electronic processing means further includes means for registering said parameter signals in said means for storing signals.

12. The apparatus of claim 1, wherein:
said sensed temperature signals provided by said temperature sensor means further includes an actual outside air temperature signal;
said means for storing signals further includes unoccupied proportional gain signals, each at a magnitude associated with a different value of said actual outside air temperature signal, said gain signals having magnitudes extending from a maximum value associated with a minimum outside air temperature signal magnitude, to a minimum value associated with a maximum outside air temperature signal magnitude; and said processing means further includes means for successively sampling periodically and registering in said means for storing signals, successively sampled values of said sensed signals including said actual outside air temperature signal, said processing means providing in each sampling period, in the presence of said unoccupied signal manifestation in the absence of said pump off gate signal, an unoccupied hot fluid reference discharge temperature signal at a magnitude in dependence on the product of said actual outside air temperature signal related to said sampling period and the unoccupied proportional gain signal associated therewith, said processing means presenting said unoccupied hot fluid reference discharge temperature signal to the hot source to provide modulation of the hot fluid discharge temperature in dependence on the magnitude thereof.

13. The apparatus of claim 12, further comprising:

means responsive to operator control for providing parameter signals representative of said real time intervals establishing the space occupied and unoccupied periods, said perimeter heat actuating temperature signal, and said unoccupied proportional gain signals, in response to selective operation thereof; and wherein said electronic processing means further includes means for registering said parameter signals in said means for storing signals.

14. Apparatus for controlling, during unoccupied periods, the operation of an HVAC providing temperature conditioned air to a living space having occupied and unoccupied periods, the HVAC including heating and cooling apparatus for conditioning mixed air, including outside air and return air from the space, presented in heat exchange relationship therewith by a fan from a mixed air chamber, the fan being energized by connection to a voltage source, the heating and cooling apparatus providing heat and cold air at a discharge temperature in dependence on hot and cold space temperature error signals presented thereto at a magnitude equal to the temperature difference between an actual space temperature and corresponding space heat and cool reference temperatures, the HVAC presenting mixed air to the space in the absence of space temperature error signals, the mixed air chamber including outside air and return air dampers for providing the mixed air through position modulation of the dampers in response to a mixed air space temperature error signal presented thereto at a magnitude equal to the temperature difference between the actual space temperature and a space mixed air reference temperature, the apparatus comprising:

HVAC temperature sensor means for providing an actual hot air discharge temperature signal, an actual cold air discharge temperature signal, and an actual mixed air temperature signal;

space temperature sensor means for providing an actual space temperature signal;

outside temperature sensor means for providing an actual outside air temperature signal;

electronic processing means, providing an actual time of day signal, and having means for storing signals including real time signals establishing a plurality of real time intervals, each interval representative of an associated one of the space occupied and unoccupied periods, said processing means comparing said actual time of day signal with said real time intervals for providing an unocupied signal manifestation in response to said actual time of day signal indicating a present unoccupied period, said means for storing signals further including occupid space heat and cool reference temperature signals, and unoccupied space heat and cool reference temperature signals at a lower and higher temperature value, respectively, than the corresponding occupied reference signals, said processing means being responsive to said sensor means for providing, in the presence of said unoccupied signal manisfestation, a comparison of said actual space temperature signal to said unoccupied space heat and cool reference temperature signals to provide unoccupied space heat and cool temperature error signals, respectively, in response to a temperature difference therebetween, said processing means providing hot air and cold air reference discharge temperature signals in response to the presence of a related one of said unoccupied space heat and cool temperature error signals, each at a magnitude in dependence on the associated one of said unococupied space heat and cool temperature error signals, said processing means presenting said reference discharge temperature signals to the heating and cooling apparatus to provide modulation of the respective discharge temperatures in dependence on the magnitude thereof, said processing means further providing, in the presence of said unoccupied signal manifestation in the absence of both of said unoccupied space heat and cool temperature error signals, a fan turn-off gate signal; and gated switch means, interconnected between the voltage source and the fan, and responsive to said fan turn-off gate signal presented at a gate input thereof, said switch means providing connection of the fan to the voltage source in the absence of said turn-off gate signal, said switch means not providing connection of the fan to the voltage source in the presence of said turn-off gate signal.

15. The apparatus of claim 14, wherein:

said means for storing signals further includes a space mixed air reference temperature signal representative of a temperature value within a range of temperatures between said unoccupied space heat reference temperature signal and said unoccupied space cool reference temperature signal, said means for storing signals further including real time signals representative of a precool time interval in each unoccupied period; and wherein said processing means compares said actual time of day signal with said real time signals representative of said precool interval for providing a precool signal manifestation in response to said actual time of day signal indicating a present precool time interval, said processing means, in the presence of said precool signal manifestation, comparing said actual space temperature signal to said space mixed air reference temperature signal to provide a mixed air space temperature error signal at a magnitude in dependence on a temperature difference therebetween, said processing means, in the presence of said precool signal manifestation, providing said fan turn-off gate signal only in response to the absence of said mixed air space temperature error signal, said processing means presenting said mixed air temperature signal to the HVAC mixed air chamber to provide position modulation of the outside air and return air dampers in response to said temperature difference.

16. The apparatus of claim 15, further comprising:
means responsive to operator control for providing parameter signals representative of said real time signals indicative of the space occupied and unoccupied periods, said real time signals indicative of said precool time interval, said occupied space heat and cool reference temperature signal, said unoccupied space heat and cool temperature reference signals, and said space mixed air reference temperature signal, in response to selective operation thereof; and wherein said electronic processing means further includes means for registering said parameter signals in said means for storing signals.

* * * * *